US012711327B2

(12) United States Patent
Wang et al.

(10) Patent No.: US 12,711,327 B2
(45) Date of Patent: Aug. 18, 2026

(54) SEQUENCE MODELING VIA SEGMENTATIONS

(71) Applicant: Microsoft Technology Licensing, LLC, Redmond, WA (US)

(72) Inventors: Chong Wang, Bellevue, WA (US); Yining Wang, Pittsburgh, PA (US); Po-Sen Huang, Bellevue, WA (US); Abdelrahman Samir Abdelrahman Mohamed, Redmond, WA (US); Dengyong Zhou, Redmond, WA (US); Li Deng, Redmond, WA (US); Sitao Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1770 days.

(21) Appl. No.: 15/903,942

(22) Filed: Feb. 23, 2018

(65) Prior Publication Data

US 2019/0266246 A1 Aug. 29, 2019

(51) Int. Cl.

| | |
|---|---|
| ***G06F 40/58*** | (2020.01) |
| ***G06N 3/044*** | (2023.01) |
| ***G06N 3/045*** | (2023.01) |
| ***G06N 7/01*** | (2023.01) |
| ***G06N 20/00*** | (2019.01) |
| ***G10L 15/28*** | (2013.01) |

(52) U.S. Cl.

CPC ............. *G06F 40/58* (2020.01); *G06N 3/044* (2023.01); *G06N 3/045* (2023.01); *G06N 7/01* (2023.01); *G06N 20/00* (2019.01); *G10L 15/28* (2013.01)

(58) Field of Classification Search

CPC ........ G06F 40/58; G06N 20/10; G06N 20/20; G06N 3/04; G06N 7/05; G10L 15/28

See application file for complete search history.

(56) References Cited

U.S. PATENT DOCUMENTS

| | | | | |
|---|---|---|---|---|
| 8,630,847 | B2 * | 1/2014 | Tang | G06F 40/284 704/7 |
| 9,852,177 | B1 * | 12/2017 | Cheung | G06F 16/245 |
| 10,121,467 | B1 * | 11/2018 | Gandhe | G06F 40/247 |

(Continued)

OTHER PUBLICATIONS

Speech Recognition With Deep Recurrent Neural Networks (Year: 2013).*

(Continued)

*Primary Examiner* — Omar F Fernandez Rivas
*Assistant Examiner* — Em N Trieu
(74) *Attorney, Agent, or Firm* — Schwegman Lundberg & Woessner, P.A.

(57) ABSTRACT

In neural-network-based approaches to sequence modeling, an output sequence may be modeled via segmentations, the probability of the output sequence being constructed as a sum of products of output-segment probabilities, taken over all valid output-sequence segmentations. A set of artificial neural networks may model the distribution of the output-sequence probability with a recurrent neural network modeling the distributions of the individual output-segment probabilities, optionally in conjunction with a second recurrent neural network modeling concatenations of output segments. In various embodiments, this approach is applied to neural phrase-based machine translation.

13 Claims, 13 Drawing Sheets

(56) References Cited

U.S. PATENT DOCUMENTS

2003/0135356 A1* 7/2003 Ying .................... G06F 40/211 704/1
2008/0306725 A1* 12/2008 Moore .................... G06F 40/44 704/2
2009/0119162 A1* 5/2009 Kaplan .................. G06Q 10/04 709/224
2011/0173000 A1* 7/2011 Yamamoto .......... G10L 15/1815 704/E15.001
2012/0065976 A1* 3/2012 Deng .................... G06N 3/084 704/256.1
2017/0200076 A1* 7/2017 Vinyals .................. G06N 3/044
2018/0174576 A1* 6/2018 Soltau .................... G10L 15/16
2018/0174579 A1* 6/2018 Henry .................... G10L 15/197
2018/0232632 A1* 8/2018 Kaskari .................. G06N 3/049

OTHER PUBLICATIONS

Word Reordering and a Dynamic Programming Beam Search Algorithm for Statistical Machine Translation (Year: 2003).*
Translating Phrases in Neural Machine Translation (Year: 2017).*
Efficient Inference on Sequence Segmentation Models (Year: 2006).*
Sequence-to-Sequence Learning as Beam-Search Optimization (Year: 2016).*
Sagawagi et al. "Efficient Inference on Sequence Segmentation Models", 2006, IIT Bombay, pp. 793-800 (Year: 2006).*
Tillmann et al. "Word Reordering and a Dynamic Programming Beam Search Algorithm for Statistical Machine Translation", 2003, IBM T. J. Watson Research Center, pp. 1-37. (Year: 2003).*
Wang et al. "Translating Phrases in Neural Machine Translation", 2017, Soochow University, Suzhou, China, pp. 1-11 (Year: 2017).*
Wiseman et al. "Sequence-to-Sequence Learning as Beam-Search Optimization", 2016, Harvard University Cambridge, MA, USA, pp. 1-11 (Year: 2016).*
Jelinek et al. "Computation of the Probability of Initial Substring Generation by Stochastic Context-Free Grammars" 1991, IBM T. J. Watson Research Center , pp. 1-10. (Year: 1991).*
Graves et al. "Speech Recognition With Deep Recurrent Neural Networks", 2013, Department of Computer Science, University of Toronto, pp. 1-5 (Year: 2013).*
Amodei, et al., "Deep speech 2: End-to-end speech recognition in English and Mandarin", In Proceedings of the 33rd International Conference on Machine Learning, Jun. 11, 2016, pp. 1-28.
Bahdanau, et al., "An actor-critic algorithm for sequence prediction", In Proceedings of International Conference on Learning Representations, Apr. 26, 2017, pp. 1-17.
Bahdanau, et al., "Neural machine translation by jointly learning to align and translate", In Publication of arXiv preprint arXiv:1409.0473, Sep. 1, 2014, pp. 1-15.
Blei, et al., "Latent Dirichlet allocation", In Journal of Machine Learning Research, vol. 3, Jan. 2003, pp. 993-1022.
Braun, et al., "Statistical methods for DNA sequence segmentation", In Journal of Statistical Science, vol. 13, No. 2, May 1, 1998, pp. 142-162.
Cettolo, et al., "Report on the 11th IWSLT evaluation campaign, IWSLT 2014", In Proceedings of the International Workshop on Spoken Language Translation, Dec. 4, 2014, pp. 2-17.
Cettolo, et al., "The IWSLT 2015 evaluation campaign", In Proceedings of the 12th International Workshop on Spoken Language Translation, Dec. 3, 2015, pp. 2-14.
Chorowski, et al., "Attention-based models for speech recognition", In Journal of Advances in Neural Information Processing Systems, Jun. 24, 2015, pp. 1-19.
Chung, et al., "Empirical evaluation of gated recurrent neural networks on sequence modeling", In Publication of arXiv preprint arXiv:1412.3555, Dec. 11, 2014, pp. 1-9.
Dahlmann, et al., "Neural machine translation leveraging phrase-based models in a hybrid search", In Proceedings of the Conference on Empirical Methods in Natural Language Processing, Aug. 10, 2017, 10 Pages.
Dauphin, et al., "Language modeling with gated convolutional networks", In Proceedings of the 34th International Conference on Machine Learning, Aug. 6, 2017, 9 Pages.
Deng, et al., "Structured speech modeling", In Journal of IEEE Transactions on Audio, Speech, and Language Processing, vol. 14, No. 5, Sep. 2006, pp. 1492-1504.
Gehring, et al., "Convolutional sequence to sequence learning", In Proceedings of the 34th International Conference on Machine Learning, Aug. 6, 2017, 15 Pages.
Graves, et al., "Connectionist temporal classification: labelling unsegmented sequence data with recurrent neural networks", In Proceedings of the 23rd international conference on Machine learning, Jun. 25, 2006, 8 Pages.
Graves, Alex., "Generating sequences with recurrent neural networks", In Publication n Publication of arXiv preprint arXiv:1308.0850, Aug. 4, 2013, pp. 1-43.
Graves, Alex., "Sequence transduction with recurrent neural networks", In Publication of arXiv preprint arXiv:1211.3711, Nov. 14, 2012, 9 Pages.
Graves, et al., "Speech recognition with deep recurrent neural networks", In Proceedings of IEEE International Conference on Acoustics, Speech and Signal Processing, May 26, 2013, 5 Pages.
Hannun, et al., "Deep speech: Scaling up end-to-end speech recognition", In Publication of arXiv preprint arXiv:1412.5567, Dec. 17, 2014, pp. 1-12.
Heafield, et al., "Scalable modified Kneser-Ney language model estimation", In Proceedings of the 51th Annual Meeting of the Association for Computational Linguistics: Short Papers—vol. 2, Aug. 4, 2013, 7 Pages.
Hochreiter, et al., "Long short-term memory", In Journal of Neural Computation, vol. 9, Issue 8, Nov. 15, 1997, pp. 1735-1780.
Hoffman, et al., "Stochastic variational inference", In Journal of Machine Learning Research, vol. 14, Jan. 1, 2013, pp. 1303-1347.
Jaitly, et al., "An online sequence-to-sequence model using partial conditioning", In Proceedings of Advances in Neural Information Processing Systems, Dec. 5, 2016, 9 Pages.
Yu, et al., "The neural noisy channel", In Proceedings of International Conference on Learning Representations, Apr. 24, 2017, pp. 1-13.
Kingma, et al., "Adam: A method for stochastic optimization", In Publication of arXiv preprint arXiv:1412.6980, Dec. 22, 2014, pp. 1-15.
Kingma, et al., "Auto-encoding variational bayes", In Publication of arXiv preprint arXiv:1312.6114, Dec. 20, 2013, pp. 1-14.
Koehn, Philipp., "Statistical Machine Translation", In Publication of Cambridge University Press, Dec. 17, 2009, 9 Pages.
Koehn, et al., "Statistical phrase-based translation", In Proceedings of the Conference of the North American Chapter of the Association for Computational Linguistics on Human Language Technology—vol. 1, May 27, 2003, 8 Pages.
Kong, et al., "Segmental recurrent neural networks", In Publication of arXiv preprint arXiv:1511.06018, Nov. 18, 2015, pp. 1-10.
Lee, et al., "Speaker-independent phone recognition using hidden markov models", In Journal of IEEE Transactions on Acoustics, Speech, and Signal Processing, vol. 37, No. 11, Nov. 1989, 25 Pages.
Lopez, Adam, "Statistical machine translation", In Proceedings of ACM Computing Surveys, vol. 40, No. 3, Article 8, Aug. 1, 2008, pp. 1-55.
Luong, et al., "Effective approaches to attention-based neural machine translation", In Proceedings of the Conference on Empirical Methods in Natural Language Processing, Sep. 17, 2015, pp. 1412-1421.
Luong, et al., "Stanford neural machine translation systems for spoken language domains", In Proceedings of the International Workshop on Spoken Language Translation, Dec. 3, 2015, pp. 76-79.
Maas, et al., "First-pass large vocabulary continuous speech recognition using bi-directional recurrent DNNs", In Journal of Computing Research Repository, Aug. 2014, pp. 1-7.
Miao, et al., "Neural variational inference for text processing", In Proceedings of the 33rd International Conference on Machine Learning, Jun. 11, 2016, 10 Pages.

(56) References Cited

OTHER PUBLICATIONS

Papineni, et al., "BLEU: a method for automatic evaluation of machine translation", In Proceedings of the 40th Annual Meeting on Association for Computational Linguistics, Jul. 6, 2002, 8 Pages.
Raffel, et al., "Online and linear-time attention by enforcing monotonic alignments", In Proceedings of International Conference on Machine Learning, Aug. 6, 2017, 19 Pages.
Ranzato, et al., "Sequence level training with recurrent neural networks", In Journal of Computing Research Repository, Nov. 2015, pp. 1-16.
Rezende, et al., "Stochastic backpropagation and approximate inference in deep generative models", In Proceedings of the 31st International Conference on Machine Learning, Jun. 21, 2014, 14 Pages.
Sarawagi, et al., "Semi-markov conditional random fields for information extraction", In Journal of Advances in neural information processing systems, Dec. 13, 2004, 8 Pages.
Sutskever, et al., "Sequence to sequence learning with neural networks", In Journal of Advances in neural information processing systems, Dec. 8, 2014, pp. 1-9.
Tang, et al., "Neural machine translation with external phrase memory", In Journal of Computing Research Repository, Jun. 2016, 9 Pages.
Vaswani, et al., "Attention Is All You Need", In Proceedings of Thirty-first Annual Conference on Neural Information Processing Systems, Dec. 4, 2017, pp. 1-15.
Wang, et al., "Collaborative topic modelling for recommending scientific articles", In Proceedings of the 17th ACM SIGKDD international conference on Knowledge discovery and data mining, Aug. 21, 2011, pp. 448-456.
Wang, et al., "Sequence modeling via segmentations", In Proceedings of International Conference on Machine Learning, Aug. 6, 2017, 10 Pages.
Wang, et al., "Translating phrases in neural machine translation", In Proceedings of the Conference on Empirical Methods in Natural Language Processing, Sep. 9, 2017, 11 Pages.
Wiseman, et al., "Sequence-to-sequence learning as beam-search optimization", In Journal of Computing Research Repository, Jun. 2016, 11 Pages.
Zhou, et al."Deep recurrent models with fast-forward connections for neural machine translation", In Journal of Transactions of the Association for Computational Linguistics, vol. 4, Jun. 14, 2016, 13 Pages.
Wu, et al., "Google's neural machine translation system: Bridging the gap between human and machine translation", In Publication of arXiv preprint arXiv:1609.08144, Sep. 26, 2016, pp. 1-23.
Yu, et al., "Online segment to segment neural transduction", In Proceedings of the Conference on Empirical Methods in Natural Language Processing, Nov. 1, 2016, 10 Pages.
Zhang, et al. "Towards end-to-end speech recognition with deep convolutional neural networks", In Publication of arXiv preprint arXiv:1701.02720, Jan. 10, 2017, 5 Pages.
Jordan, Michael I., Learning in Graphical Models, The MIT Press, Cambridge, Massachusetts, Jan. 1999, 1-634.

* cited by examiner

| | <pad> | <pad> | <pad> | can | you | translate | it | ? | <pad> | <pad> | <pad> |
|---|---|---|---|---|---|---|---|---|---|---|---|
| ubersetzen ? | | | | | 0.0031 | 0.0343 | 0.0005 | 0.2644 | 0.0042 | 0.0073 | 0.0066 |
| es | | | | 0.0004 | 0.0002 | 0.0020 | 0.2728 | 0.0045 | 0.0021 | 0.0012 | |
| $ | | | 0.0004 | 0.0003 | 0.0009 | 0.3147 | 0.0012 | 0.0002 | 0.0009 | | |
| man | | 0.0004 | 0.0002 | 0.0036 | 0.2732 | 0.0084 | 0.0018 | 0.0003 | | | |
| konnen | 0.0040 | 0.0024 | 0.0130 | 0.2432 | 0.0092 | 0.0119 | 0.0043 | | | | |

FIG. 11

SEQUENCE MODELING VIA SEGMENTATIONS

BACKGROUND

In recent years, a lot of research in machine learning has focused on modeling sequence data, and especially on sequence-to-sequence transduction, that is, the prediction of an output sequence from a given input sequence. Sequence modeling is relevant for many tasks related to natural-language processing, including, for example, machine translation, speech recognition, handwriting recognition, and language modeling; however, it also has applications in other disciplines, e.g., for protein or DNA structure prediction. Real-world sequence modeling tasks present a number of challenges-generally differing between types of tasks. For example, handwriting and speech recognition involve the prediction of a sequence of labels (from a set of possible labels, such as a set of letters or phonemes) from noisy, a-priori unsegmented input data (e.g., image data capturing a continuous pen-stroke sequence, or audio data, respectively). In machine translation from text in a source language to text in a target language, the input comes practically noise-free and pre-segmented into words; however, with human languages, the word order is often not preserved in the translation, and even the number of words can differ between input and output sequences, such that a naïve, sequential mapping from input to output elements may yield unsatisfactory results.

A variety of neural-network-based approaches to sequence modeling have been developed. The various approaches differ in their respective capabilities and limitations; some of them are tailored to a specific task or class of tasks and therefore meet some of the above-noted challenges better than others. One approach, known as connectionist temporal classification (CTC), uses recurrent neural networks to map an unsegmented input sequence to an output sequence of labels that is no longer than the input sequence; CTC has had some success in speech recognition. Follow-up research on CTC has led to a sequence transducer that allows for output sequences of any length and furthermore models sequential dependencies between input and output and within the output sequence. The sequence transducer extends the range of applications to tasks such as text-to-speech (where the output sequence is generally longer than the input sequence), but it conditions the prediction of the output sequence on the entire input sequence. Yet another approach involves "online" sequence-to-sequence modeling with partial conditioning to allow for incremental predictions as an input stream arrives, albeit at the cost of some approximation in the alignment between input and output sequences.

SUMMARY

This summary section is provided to introduce aspects of embodiments in a simplified form, with further explanation of the embodiments following in the detailed description. This summary section is not intended to identify essential or required features of the claimed subject matter, and the particular combination and order of elements listed in this summary section is not intended to provide limitation to the elements of the claimed subject matter.

Disclosed herein is a neural-network-based approach to sequence modeling (e.g., for use in speech recognition, machine translation, or other natural-language-processing tasks) in which the output sequence is explicitly treated as broken up into sub-sequences herein referred to as "segments." This approach is based on the observation that many types of sequences—including, in particular, natural-language sequences—admit of segmental structure, and on the assumption that such segmental structure can be leveraged to make better output predictions for a given input. Sentences, for instances, can be structured into phrases each including one or more words (the words constituting the elements of the sequence, and the phrases constituting the segments), and the meaning of the individual words can be informed by the context of the phrases in which they appear.

In contrast to many prior approaches to sequence modeling (including some approaches that model sequences via segments), the instant approach does not require a segmented input sequence, and, indeed, not even sequence input. The instant approach models the probability of an output sequence as the product of the probabilities of the output segments for a given segmentation, summed over all valid segmentations. For non-sequence input, all output-segment probabilities are conditioned on that input. For sequence input, each input element of the input sequence is deemed to emit exactly one output segment, empty segments being permitted. In this manner, the instant approach allows for output sequences of any length relative to the input sequence. Further, it discovers the segmentation of the input sequence implicitly, rather than taking it as input information.

In accordance with various embodiments, probability distributions of the output segments are modeled with recurrent neural networks all sharing the same network parameters (or, put differently, with multiple instances of the same recurrent neural network). These networks may be conditioned not only on the respective input (element), but also on the concatenation of preceding output segments, which may be modeled with a separate recurrent neural network. The set of neural networks may be trained by backward propagation or errors, using dynamic programming techniques to reduce the computational complexity. For example, in some embodiments, during the forward phase, the probability of the output sequence is computed from recursively defined forward and backward propagations that depend on the individual segment probabilities. Further, to reduce the computational cost of computing the segment probabilities themselves, as well as their gradients as needed for the backward phase, the length of the segments may be limited to a fixed maximum value, and computations for longer segments may be reused for shorter segments contained in the longer segments. Once the neural network has been trained, an output sequence may be predicted from a given input, using a beam search algorithm. In some embodiments, a separate beam search is performed for each output segment to compute possible extensions of partial output sequences constructed from preceding segments, and if different segmentations result in multiple instances of the same partial output sequence, those are merged. Beneficially, in accordance with various embodiments, the beam search algorithm allows for incremental predictions of the output sequence.

In various embodiments, the segmentation-based sequence modeling approach described herein is applied to the problem of machine translation of text or speech from one human language to another. In this context, the assumption of monotonic alignment between the input and output sequences, as is implicit in modeling each input element as emitting a respective output segment, generally does not hold. To address this issue, the neural-network architecture is expanded with an additional layer that locally reorders elements of a sequence representing the source-language input, and then passing an encoding of the reordered sequence on as input to the neural networks generating the output sequence.

Accordingly, in one aspect, a method involves constructing an output-sequence probability as a sum, taken over all valid output-sequence segmentations, of products of output-segment probabilities; modeling a distribution of the output-sequence probability with a set of one or more artificial neural networks, and using one or more hardware processors to train the set of artificial neural networks. The set of artificial neural networks models the distributions of the output-segment probabilities with respective instances of a first recurrent neural network having an associated softmax layer, and, in training the neural networks, a dynamic programming algorithm is used to recursively compute the output-sequence probability from the output-segment probabilities. In some embodiments, the output-segment probabilities depend on respective concatenations of preceding output segments, and the set of artificial neural networks models the concatenations with a second recurrent neural network.

Computing the output-sequence probability may include recursively computing forward and backward probabilities for two-way output-sequence partitionings. Further, the set of artificial neural networks may be trained using backward propagation of errors, and, in computing the output-segment probabilities during a forward propagation phase and in computing gradients of the output-segment probabilities used during a backward propagation phase, contributions computed for longer output segments may be reused during computations for shorter output segments contained in the respective longer output segments. In some embodiments, in computing the output-segment probabilities, an output-segment length is limited to a specified maximum value.

The method may further include using the one or more hardware processors to perform a beam search algorithm to determine an output sequence for a given input based on the trained set of artificial neural networks. The input may be an input sequence, and the beam search algorithm may include, for each element of the input sequence, performing a left-to-right beam search and thereafter merging any identical partial candidate output sequences obtained for multiple respective segmentations of the output sequence.

In some embodiments, the output-sequence probability is constructed for non-sequence input, and empty segments are not permitted in output sequences. In other embodiments, the output-sequence probability is constructed for an input sequence, and the output sequence is modeled as monotonically aligned with the input sequence and as having a number of segments equal to a number of elements in the input sequence, empty segments being permitted. The input sequence may represent a human-language sequence in a first language and the output sequence may represent a human-language sequence in a second language that corresponds to a translation from the first language. The method may further include training a second set of neural networks that generates the input sequence from the human-language sequence in the first language. The second set of neural networks may include a network layer that locally reorders elements of a sequence of embedded representations of elements of the human-language sequence in the first language; an output element of that network layer may be computed as a non-linear transformation of a weighted liner combination of elements of the sequence of embedded representations within an input window, each element being weighted in the weighted linear combination by gate values that depend on all elements within the input window. The second set of neural networks may further include a word-embedding layer that generates the embedded representations of the elements of the human-language sequence in the first language by word embedding, and/or a bidirectional recurrent neural network that generates the input sequence from the reordered sequence of embedded representations.

In another aspect, one or more machine-readable media store data defining a trained set of (one or more) artificial neural networks modeling an output-sequence probability, and instructions for execution by one or more hardware processors that, when executed, cause the one or more hardware processors to perform operations for creating an output sequence from an input. The output-sequence probability is constructed as a sum of products of output-segment probabilities taken over all valid output-sequence segmentations, and the set of artificial neural networks models the distributions of the output-segment probabilities with respective instances of a recurrent neural network having an associated softmax layer. The operations performed by the one or more hardware processors include using a beam search algorithm to determine the output sequence for the input based on the trained set of artificial neural networks. The input may be an input sequence, and the beam search algorithm may include, for each element of the input sequence, performing a left-to-right beam search and thereafter merging any identical partial candidate output sequences obtained for multiple respective segmentations of the output sequence. In some embodiments, the set of artificial neural networks is trained based on pairs of input and output sequences that represent human-language sequences in first and second languages, the output sequences corresponding to translations from the first language into the second language. The data may further define a second set of artificial neural networks modeling generation of the input sequences from human-language sequences in the first language, the second set of neural networks comprising a local reordering layer for locally reordering an embedded representation of the human-language sequence in the first language.

In yet another aspect, a system includes one or more hardware processors and one or more machine-readable media storing data defining a set of (one or more) artificial neural networks modeling an output-sequence probability and instructions for execution by the one or more hardware processors, wherein the output probability is constructed as a sum of products of output-segment probabilities taken over all valid output-sequence segmentations, the set of one or more artificial neural networks modeling the distributions of the output-segment probabilities with respective instances of a recurrent neural network having an associated softmax layer, and wherein the instructions, when executed by the one or more hardware processors, cause the one or more hardware processors to perform operations to train the set of one or more artificial neural networks, using a dynamic programming algorithm to recursively compute the output-sequence probability from the output-segment probabilities.

BRIEF DESCRIPTION OF THE DRAWINGS

The foregoing will be more readily understood from the following detailed description of various embodiments, in particular, when taken in conjunction with the accompanying drawings.

FIG. 11 is an example grid of gate values, illustrating the behavior of the local reordering layer in accordance with various embodiments.

DETAILED DESCRIPTION

Segmental structure is a common pattern in many types of sequences, especially human-language sequences. Speech and text, for instance, can be broken up into phonemes (distinct sounds) and the letter sequences representing phonemes (e.g., digraphs like the English "th" or "sh" or "ng"), respectively, and at a larger scale into words and phrases. To illustrate the phrase structure of sentences, for instance, consider the sentence "Machine learning is part of artificial intelligence," which can be meaningfully segmented into "[Machine learning] [is] [part of] [artificial intelligence]" (where individual segments are enclosed in square brackets). As another example, to illustrate the phoneme structure of words, consider the word "thought," which can be broken up into "[th][ou][ght]." As will be apparent from these examples, segmental structure strongly effects the statistics governing sequences, both within segments by rendering some sub-sequences (corresponding to possible segments) more likely than others, and between segments by imposing rules and restrictions (such as phonotactics rules and rules of grammar) on the permissible sequences of segments. Modeling sequences via segmentations, taking dependencies within and across segments into account, provides a way to capture such sequential statistics to improve output predictions. Yet, many machine-learning-based approaches to modeling sequences have not taken the segmental structure of output sequences into account.

Figure 1:
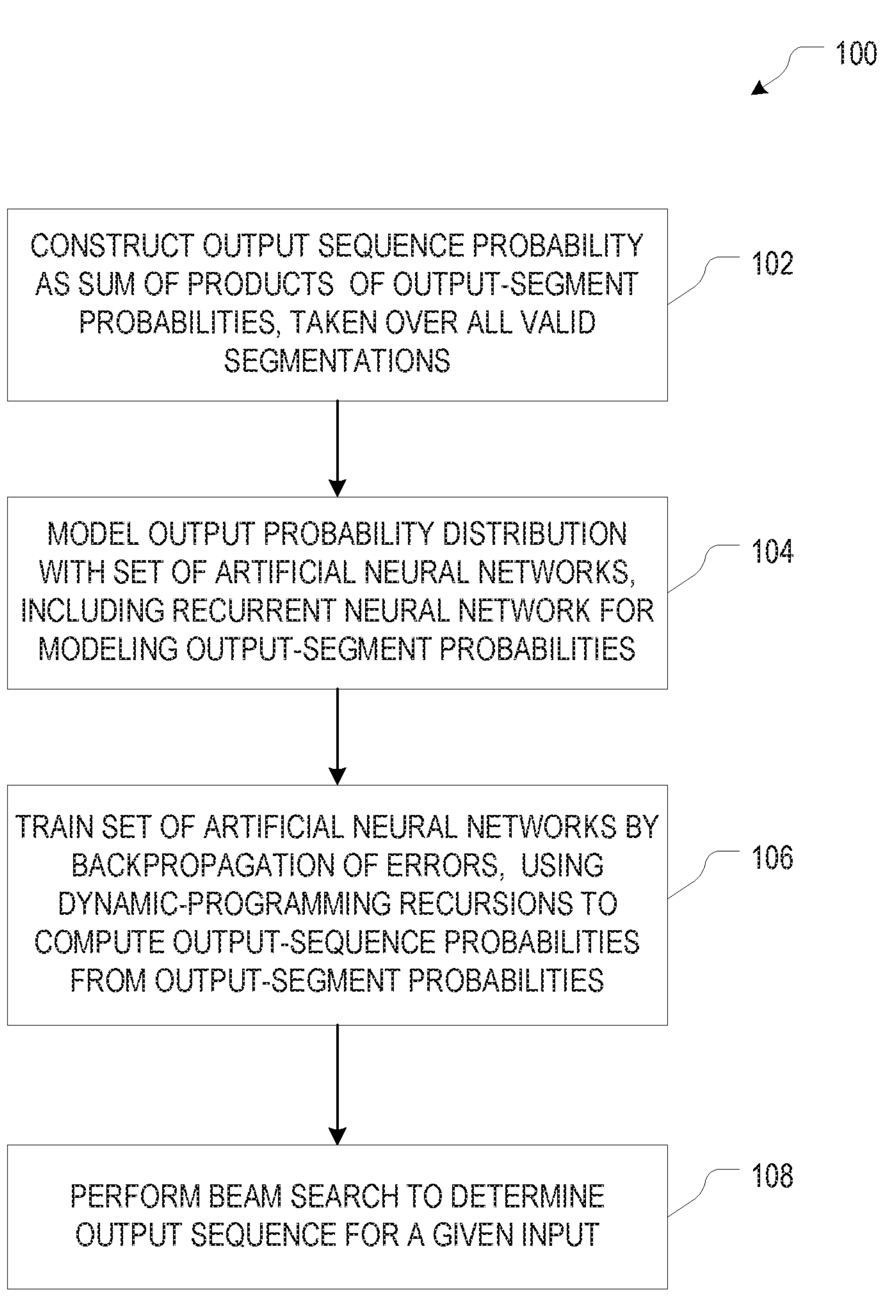
FIG. 1 is a flowchart providing an overview of neural-network-based methods for modeling sequences via segmentations, in accordance with various embodiment.

FIG. 1 is a flowchart providing an overview of a neural-network-based method 100 for modeling sequences via segmentations, in accordance with various embodiment. The goal of the method 100 is to determine an output sequence, or a probability distribution over possible output sequences, from a given input. The output sequence is herein denoted by $y_{1:T}$, where T is the length of the sequence, and the individual elements $y_t$ (t=1 . . . T) are numbers or vectors each uniquely representing, or mapping onto, one of the labels within the output "alphabet" or "vocabulary" (herein used synonymously), i.e., the set of possible labels, or onto an empty output. Depending on the task at hand, the output vocabulary may be a set of characters (e.g., all alphanumeric characters), a set of words in a given language, or some other specified set of labels. The input is in some instances a single fixed-length vector x. In other embodiments, the input is itself a sequence, herein denoted by $x_{1:T'}$, where T' is the length of the sequence, and the individual elements $x_t$ (t=1 . . . T') are fixed-length vectors. The probability of the output sequence for a given input is denoted by $p(y_{1:T}|x)$ or $p(y_{1:T}|x_{1:T'})$ for non-sequence and sequence input, respectively.

In accordance herewith, the probability of the output sequence is modeled via segmentations of $y_{1:T}$. Since the segmentation of the output sequence is not known in advance, the probability of the output sequence is modeled as the sum of the probabilities of all valid segmentations, and the probability of each segmentation, in turn, is modeled as the product of the probabilities of the individual segments. Accordingly, the method 100 involves constructing the probability of the output sequence as the sum, taken over all valid segmentations, of products of the output-segment probabilities (act 102). Denoting by $\mathcal{S}$, the set of all valid segmentations of $y_{1:T}$ and by $a_{1:\tau(a)} \in \mathcal{S}_y$ an individual segmentation within the set that consists of r(a) segments, the concatenation of $a_{1:T(a)}$ constitutes the sequence $y_{1:T}$: $\pi(a_{1:T(a)})=y_{1:T}$, where $\pi(\bullet)$ is the concatenation operator. For example, for an output sequence of length T=5, one possible segmentation into $\tau(a)=3$ segments would be $a_{1:T(a)}=\{\{y_1, \$\}, \{y_2, y_3, \$\}, \{y_4, y_5, \$\}\}$, where the dollar symbol $ denotes the end of a segment. In the concatenation operator $\pi(\bullet)$, the dollar symbol $ will be ignored. Note that, while the number of distinct segments for a length-T sequence is $\mathcal{O}(T^2)$, the number of distinct segmentations, $|\mathcal{S}_y|$, is exponentially large.

For non-sequence input x, the probability of each segment $a_t$ (t=1 . . . $\tau(a)$) in the output sequence $y_{1:T}$ depends on that input x as well as the concatenation of all previous segments, $\pi(a_{1:t-1})$. Thus, the probability of the output sequence is defined as:

$$p(y_{1:T} \mid x) \triangleq \Sigma_{a_{1:\tau(a)} \in S_y} p(a_{1:\tau(a)} \mid x) = \Sigma_{a_{1:\tau(a)} \in S_y} \prod_{t=1}^{\tau(a)} p(a_t \mid x, \pi(a_{1:t-1})).$$

Figure 2A:
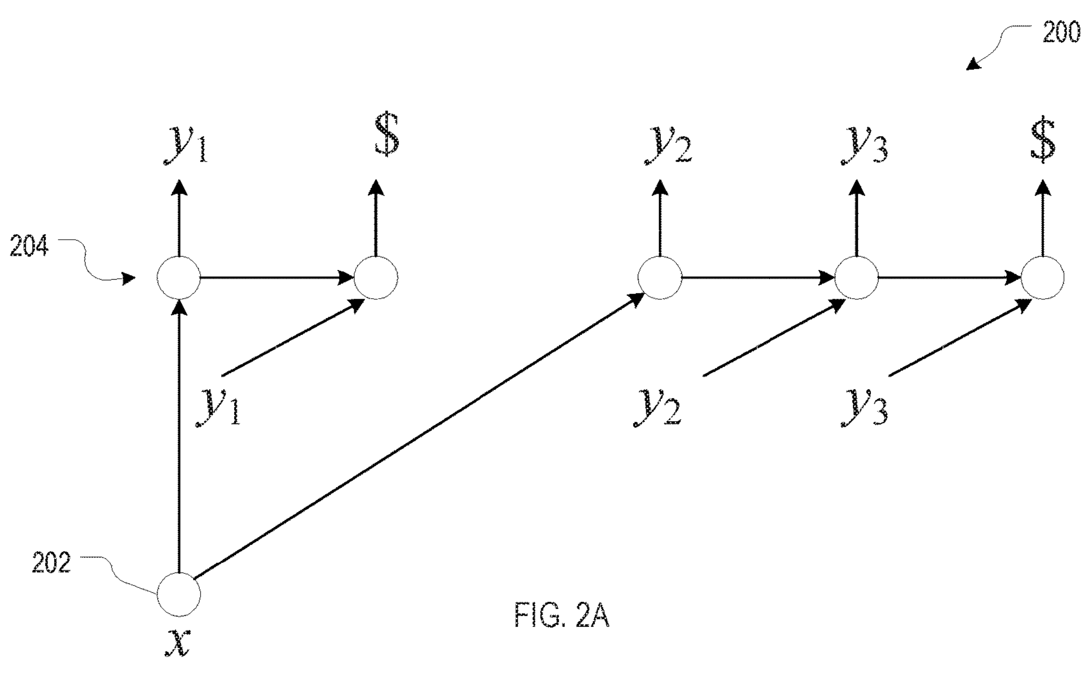
FIG. 2A is a conceptual network diagram illustrating an example mapping between non-sequence input and a segmented output sequence, in accordance with various embodiments.

To illustrate, FIG. 2A shows, in a conceptual network diagram 200, an example mapping between non-sequence input 202 and a segmented output sequence 204. As shown, the segments $\{y_1, \$\}$ and $\{y_2, y_3, \$\}$ each take x as input. (The concatenation of the preceding segments is omitted from this depiction.) Furthermore, within each segment, the output elements depend on the respective preceding output elements; for instance, within the second segment, element $y_3$ depends on element $y_2$. In the case of non-sequence input, empty segments (those containing only \$) are not permitted in the output sequence.

For sequence input, each element $x_t$ (t=1 . . . T') of the input sequence is modeled to emit exactly one segment $a_t$ of the output sequence, and, accordingly, each segmentation consists of exactly T' segments. In this scenario, empty output segments ($a_t=\{\$\}$) are permitted, such that the number of non-empty segments may be less than the number of elements in the input sequence. Since each segment may have zero, one, or more elements, this mapping places no constraints on the relative lengths of the input and output sequences (i.e., the output sequence may be shorter, longer, or equal in length to the input sequence). The mapping does, however, imply monotonic alignment between the input and output sequences, meaning that the relative order of the input elements $x_t$ and the output segments $a_t$ they emit is preserved. The probability of each output segment $a_t$ depends on the respective input element $x_t$ as well as the concatenation of all previous segments, $\pi(a_{1:t-1})$. The resulting probability of the output sequence is given by:

$$p(y_{1:T} \mid x_{1:T'}) \triangleq \Sigma_{a_{1:T'} \in S_y} p(a_{1:\tau(a)} \mid x_{1:T'}) = \Sigma_{a_{1:T'} \in S_y} \prod_{t=1}^{T'} p(a_t \mid x_t, \pi(a_{1:t-1})).$$

Figure 2B:
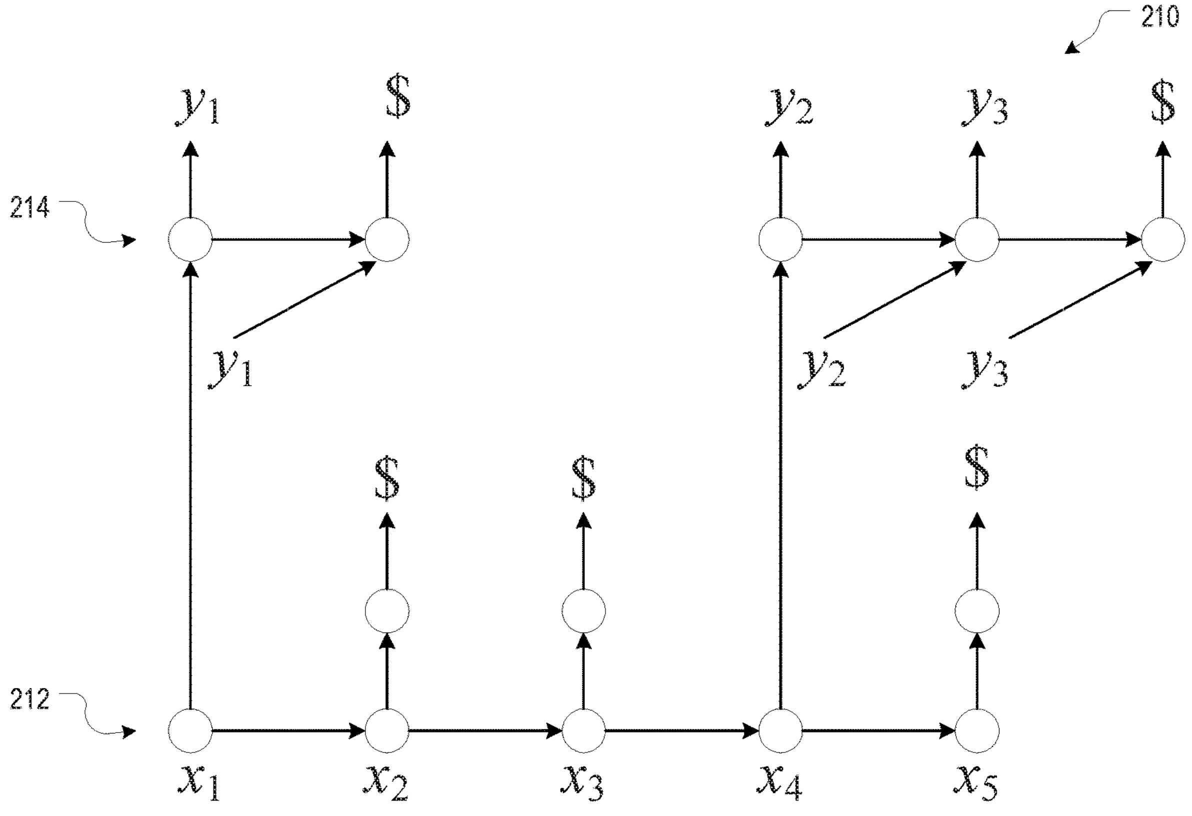
FIG. 2B is a conceptual network diagram illustrating an example mapping between an input sequence and a segmented output sequence, in accordance with various embodiments.

FIG. 2B is a conceptual network diagram 210 illustrating an example mapping between an input sequence 212 and a segmented output sequence 214 (again omitting the depiction of the dependence of a segment from the concatenation of preceding segments). Here, element $x_1$ emits segment $\{y_1, \$\}$, element $x_4$ emits segment $\{y_2, y_3, \$\}$, and elements $x_2$, $x_3$, and $x_5$ each emit an empty segment. To reflect that each input element can emit a non-empty or an empty segment, this network is also referred to as a "Sleep-Wake Network (SWAN)." As with the network for non-sequence input shown in FIG. 2A, elements within an output segment depend on the respective preceding output elements.

Figure 2C:
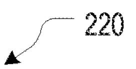
FIG. 2C is conceptual network diagram illustrating example dependencies between output segments, in accordance with various embodiments.
Figure 2C:
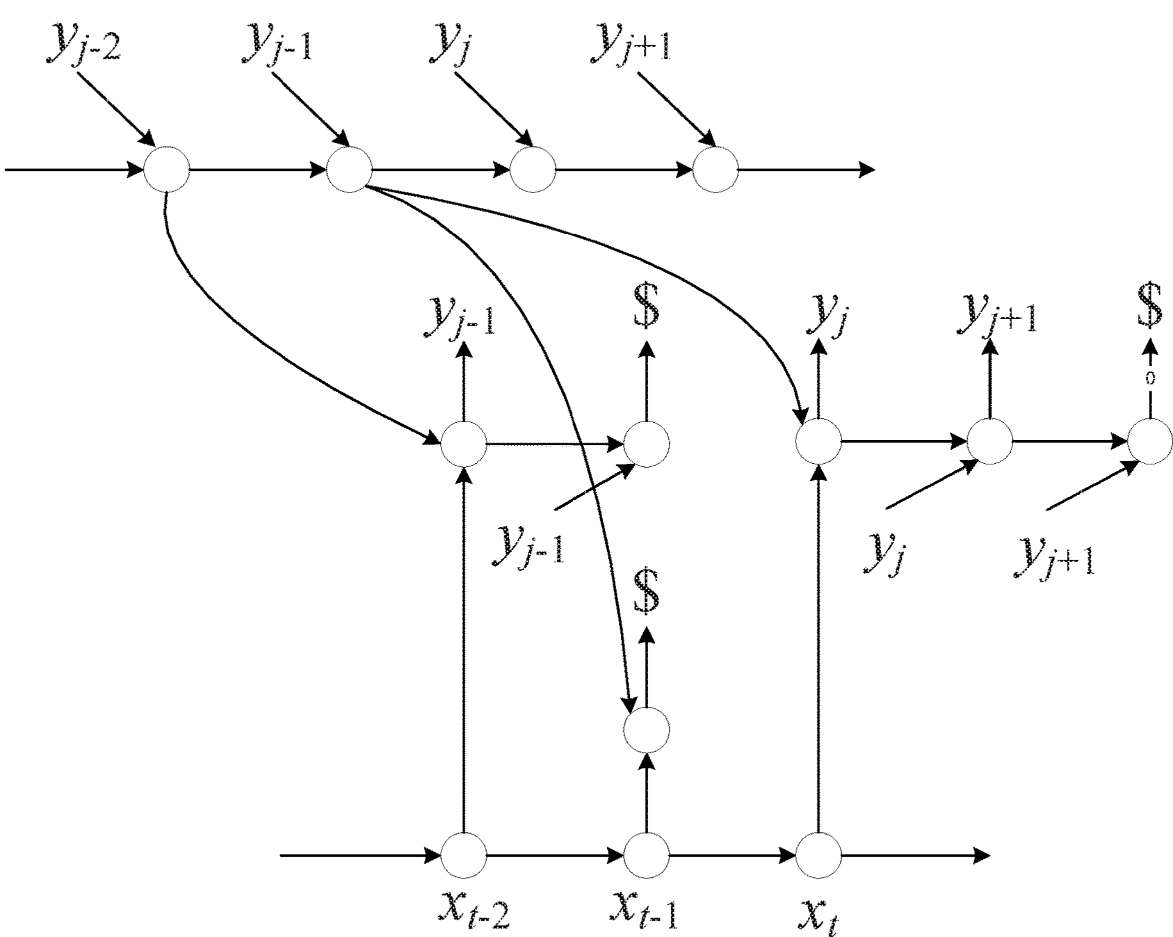

FIG. 2C is conceptual network diagram 220 illustrating example dependencies between output segments, in accordance with various embodiments. As shown, input element $x_{t\_2}$ emits a segment ending in output element $y_{j-1}$, which flows as input into the next, empty segment emitted by input element $x_{t-1}$ as well as into the segment beginning with the next output element $y_j$, which is emitted by input element $x_t$. In this manner, information is carried over across segments.

With renewed reference to FIG. 1, the probability distribution of the output sequence, constructed from the segment probabilities as described above, is modeled, in accordance with the method 100, by a set of (generally one or more) artificial neural networks (act 104). In various embodiments, the individual segment probabilities are modeled by respective instances of a first recurrent neural network (RNN) (or, put differently, by first RNNs that all share the same network parameters). This RNN may have an associated softmax layer, as is known to those of ordinary skill in the art, to turn the neural network output into a probability distribution over the output vocabulary. To capture the conditional dependence of segment probabilities on preceding segments, a second RNN may be used to model the concatenation of segments. (In some applications, such as in text segmentation where the words and phrases are taken to be interchangeable, the segments are deemed conditionally independent, and the concatenation $\pi(a_{1:t-1})$ is dropped from the above defining equations for the probability of the output sequence, $p(y_{1:T}|x)$ or $p(y_{1:T}|x_{1:T'})$, obviating the second RNN.) Although embodiments are described herein as implemented using RNNs, this is not intended to limit the scope of the disclosed subject matter. Rather, the probability distribution of the output sequence (as defined above), and the conditional probabilities distributions of the constituent output segments, may also be modeled using other types of neural networks, such as, for example, convolution neural networks or fully connected neural networks.

The set of artificial neural networks (which collectively constitute a larger-scale neural network) is trained, in act 106 of the method 100, using backward propagation of errors (a technique known to those of ordinary skill in the art). In brief, in this supervised-learning algorithm, the input of an input-output pair provided as a training example, is fed into the (larger-scale) neural network to compute, by forward propagation through the network, an associated output or probability distribution over possible outputs. A suitably defined error function (or cost function) is then used to quantify the discrepancy (or error) between the computed output and the actual output as reflected in the training example, or the computed probability of the actual output given the input of the training example (where the error can be taken as the negative logarithm of the probability). Using gradients of the error with respect to the network weights (or other network parameters), the error is then propagated backwards through the network to update the network weights. For RNNs used to compute sequential output (as is generally the case when an output segment in accordance herewith is computed), where the output at each time step is fed back into the computation of the next output, the error propagation additionally proceeds backward in time (e.g., from the error associated with the last output element to the error associated with the first output element in the output sequence), and errors computed for the network weights for the individual time steps are aggregated to determine the overall updates for the network weights. In accordance with various embodiments, training the neural network through backward propagation of errors is rendered computationally tractable by employing dynamic programming techniques to store and reuse solutions to partial computations in a recursive computation of the overall probability of the output sequence (as described in more detail below with respect to FIGS. 4-5B).

Once the (larger-scale) neural network is trained, i.e., the values of the network weights (and any other network parameters) have been determined, the neural network can be used to predict an output sequence for a given input, a process herein also referred to as "decoding" (act 108). For this purpose, a beam search algorithm may be employed. During a beam search, the output sequence is constructed by iteratively expanding partial candidate output sequences, creating a search tree structure in the process. At each level of the search tree, all children (corresponding to extensions of the partial candidate output sequences by another output element) are generated, and only the B most probable partial candidate output sequences are kept; B is referred to as the beam width. In accordance with embodiments hereof, each output segment is generated by a respective beam search, and, since different segmentations can imply the same output sequence, each time the partial candidate output sequences have been extended with a new segment, differently segmented, but otherwise identical partial candidate output sequences are merged. Beneficially, in the context of sequence transduction, modeling the output sequence as described herein allows for incremental (or "online") prediction of the output sequence during decoding, that is, rather than waiting for the input sequence to be read in and processed in its entirety, output can be generated as the input sequence is read in.

Having provided an overview of segmentation-based output sequence modeling in accordance with various embodiments, the artificial neural networks employed as well as methods for training (act 106) and decoding (act 108) will be described in more detail in the following.

Neural networks generally include an input layer with or more input nodes for receiving input from outside the network, an output layer with one or more output nodes producing the results, and, optionally, one or more "hidden" layers with hidden nodes that modify the data en route from the input layer to the output layer. The hidden nodes and output nodes each generate an output value from one or more input values (corresponding to the output values of nodes to which they are connected, weighted by the network weights assigned to the respective connections) in accordance with a (generally nonlinear) "activation function" or "transfer function." Nodes may form sub-networks that collectively generate an output value from one or more input values, operating as network "units" from which larger networks can be built. An RNN is a neural network that includes directed cycles between the network nodes or units, allowing information to be fed back from the hidden or output layers to preceding layers. RNNs are therefore useful to model sequential output with dependencies of output elements on preceding output (also often captured with the notion of "memory").

Figure 3A:
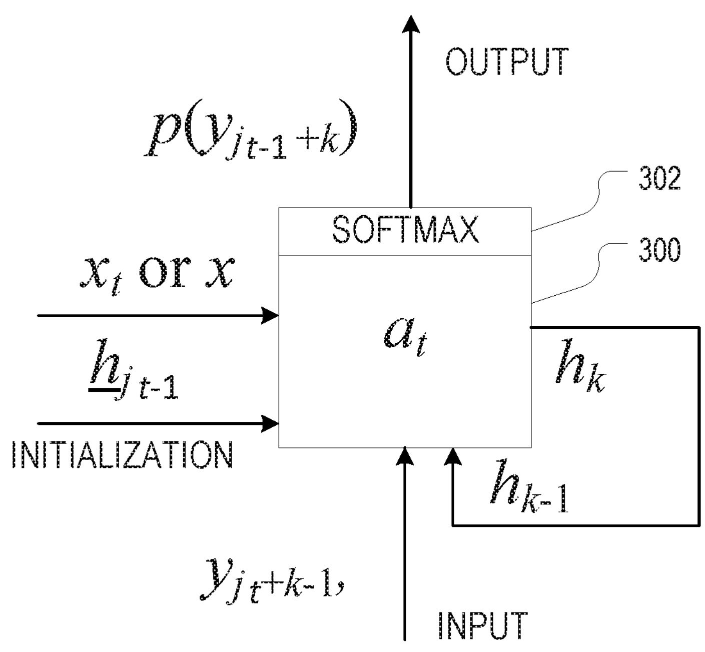
FIG. 3A is a schematic of a recurrent neural network for modeling segment probabilities, in accordance with various embodiments.

FIG. 3A schematically illustrates an example RNN 300 for modeling segment probabilities in accordance with various embodiments. The RNN 300 may include one or more hidden layers. In various embodiments, the RNN 300 is built from units such as long short-term memory (LSTM) units, gated recurrent units (GRU), or other units well-known to those of ordinary skill in the art. The output layer of the RNN 300 includes a node for each label in the vocabulary as well as for the end-of-segment symbol $. A softmax layer 302 at the output of the RNN 300 converts the output values into a probability distribution over the vocabulary and end-of-segment symbol (by mapping the output values onto values within the range [0,1] that add up to 1). In accordance with various embodiments, the probability distributions for all segments in the output sequence are modeled separately from each other, but with the same RNN 300 in multiple instances thereof. That is, all instances of the RNN 300 share the same network weights and parameters, while initializations and inputs differ between network instances for different respective segments.

The RNN 300 for segment $a_t$ and its associated softmax layer 302 sequentially produce probability distributions for output elements $y_{j_{(t-1)}+k}$ that form the segment $a_t$ (where $j_{t-1}$ denotes the index of the last output element within the preceding segment $a_{t-1}$, and k is an integer, initialized to 0, that is incremented during each pass from the input layer to the output layer of the RNN 300). At each time step k, the "hidden state" $h_k$ of the RNN 300 (where the hidden state may capture the output values of multiple of the hidden nodes) is updated, and the probability distribution for the respective output element $y_{j_{t-1}+k}$ is computed from the updated hidden state. The initial hidden state $h_0$ is based, in accordance with various embodiments, on the input element $x_t$ for segment $a_t$, or the input x in the case of non-sequence input, and on the concatenation of all previous segments as encoded in the hidden state $\underline{h}_{j_{t-1}}$ of a separate neural network (shown in FIG. 3B). The updated hidden state $h_k$ (k≥1) in each time step is computed from the respective preceding hidden state $h_{k-1}$ and the preceding element in the output sequence, $y_{j_{t-1}+k-1}$; in other words, the previous output element and hidden state constitute the inputs to the RNN 300 for updating the hidden state and computing the new output element. During training of the network, the output elements fed as input into the network 300 are provided by the known output sequence of the input-output pair constituting the training example; note that, in training, only the probability of that known output sequence is of interest, and the remaining information of the computed probability distributions may be disregarded. During decoding, where probabilities for multiple output sequences are computed in a beam search by following multiple paths through the search tree, the current path determines which of the possible values of the output element $y_{j_{t-1}+k}$ is fed back to the input of the RNN 300 for the next time step k+1. The cycles through the RNN 300 stop when the output element takes the end-of-segment symbol $.

Figure 3B:
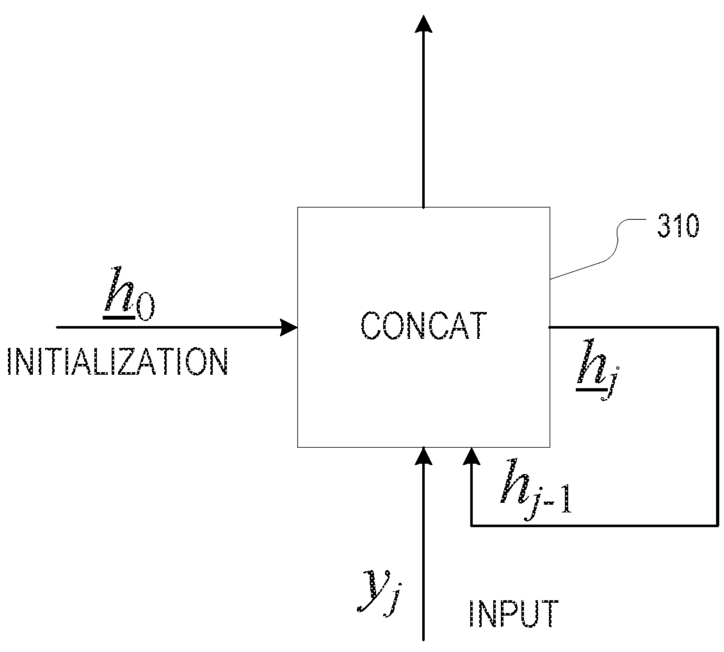
FIG. 3B is a schematic of a recurrent neural network for modeling segment interdependencies, in accordance with various embodiments.

Turning now to FIG. 3B, an example RNN 310 for modeling segment interdependencies in accordance with various embodiments is schematically shown. The RNN 310 may have one or more hidden layers, may be unidirectional or bidirectional, and may be built from LSTM, GRU, or other units. The RNN 310 takes the output sequence $y_{1:T}$ as input (one element $y_j$ at a time), and updates, in each time step j, its internal state to $\underline{h}_j$ based on its previous internal state $\underline{h}_{j-1}$ and the output element $y_j$. The internal state at the end of a segment $a_{t-1}$, $\underline{h}_{j_{t-1}}$, is provided to the RNN 300 for segment $a_t$ to initialize the internal state h of RNN 300. (Although the RNN 310 itself outputs predictions for the output element $y_j$, in various embodiments, these predictions are not themselves used and are, in particular, not fed back as input to the RNN 310, as the RNN 310 may take its input from the output of the RNN 300 for the individual segments.)

Figure 4:
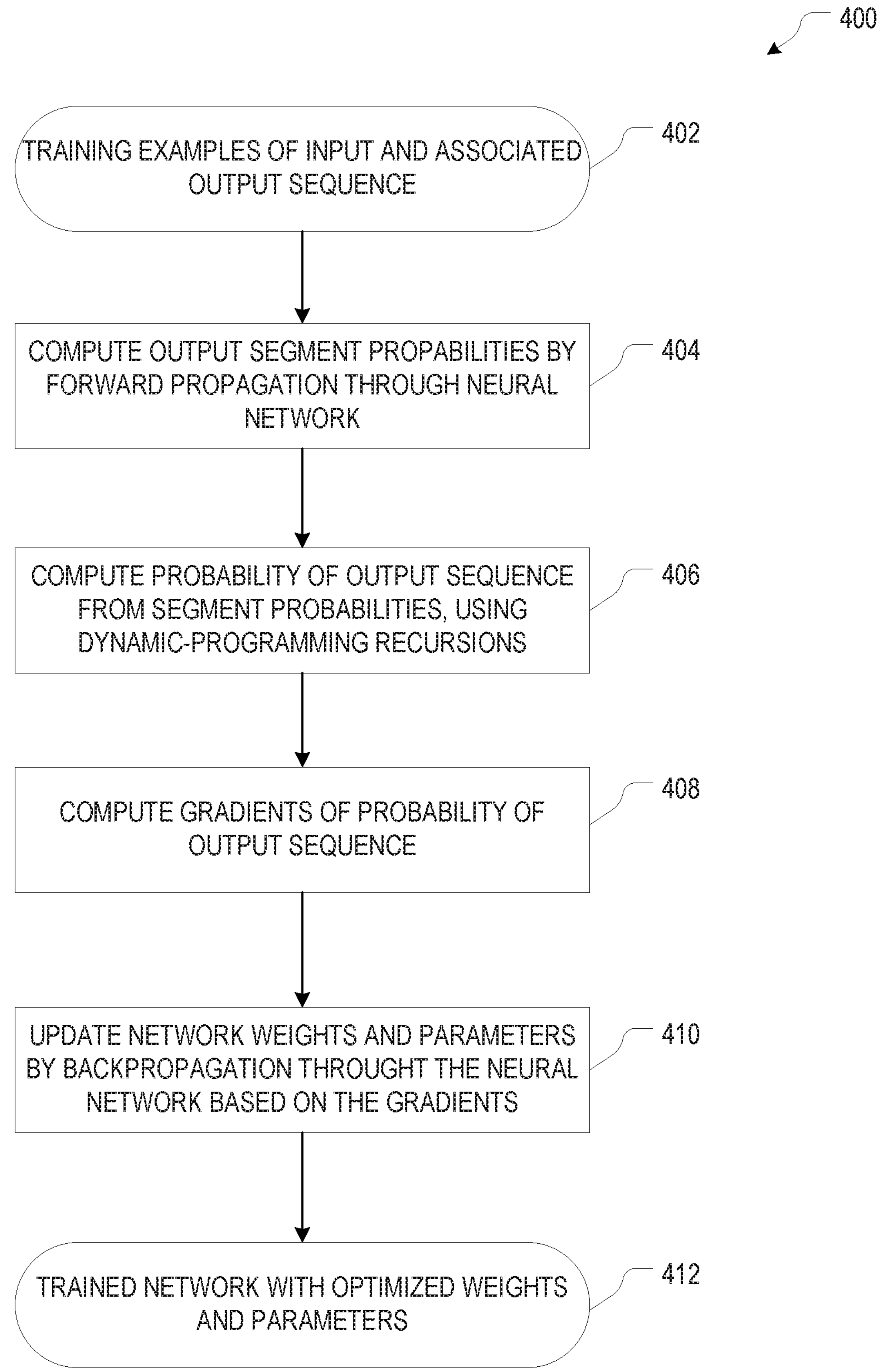
FIG. 4 is a flowchart illustrating a dynamic programming method for training a set of artificial neural networks, in accordance with various embodiments.

FIG. 4 is a flowchart illustrating an example dynamic programming method 400 for training a set of artificial neural networks that model a probability distribution for a segmented output sequence (such as RNNs 300, 310), in accordance with various embodiments. Starting point 402 of the method 400 is a set of training examples, each including a pair of an input sequence (or non-sequence input) and an output sequence. The method 400 involves, for each input-output pair, computing the probability of the output sequence given the respective input, using forward propagation through the network (acts 404, 406). In accordance with various embodiments, dynamic programming is employed to reduce the computational cost of the forward propagation. Specifically, the probability of the output sequence is computed as the sum over products of "forward and backward probabilities," which, in turn, are computed recursively based on the probabilities of the output segments.

The forward and backward probabilities for the case of sequence input are defined as:

$$\alpha_t(j) = p(y_{1:j} \mid x_{1:t})$$

$$\beta_t(j) = p(y_{j+1:T} \mid x_{t+1:T'}, y_{1:j}),$$

where the forward probability $\alpha_t(j)$ represents the probability that input $x_{1:t}$ emits output $y_{1:j}$ and the backward probability $\beta_t(j)$ represents the probability that input $x_{t+1:T'}$ emits output $y_{j+1:T}$. The indices t and j demarcate two-way partitionings of the input sequence and the output sequence, respectively. For any t=0, 1, . . . , T', the probability of the output sequence can be computed from the forward and backward probabilities for all possible two-way partitionings of the output:

$$p(y_{1:T} \mid x_{1:T'}) = \sum_{j=0}^{T} \alpha_t(j)\beta_t(j).$$

For t=T' and t=0, this sum reduces to the special case $p(y_{1:T} \mid x_{1:T'}) = a_{T'}(T) = \beta_0(0)$ (with $\alpha_0(0)=\beta_{T'}(T)=1$, and $\alpha_0(j)=0$ for all $j \neq 0$ and $\beta_{T'}(j)=0$ for all $j \neq T$).

The forward and backward probabilities can be computed recursively using the following dynamic-programming recursions:

$$\alpha_t(j) = \sum_{j'=0}^{T} \alpha_{t-1}(j') p(y_{j'+1:i} \mid x_t)$$

$$\beta_t(j) = \sum_{j'=j}^{T} \beta_{t+1}(j') p(y_{j+1:j'} \mid x_{t+1}),$$

where $p(y_{j'+1:j} \mid x_t)$ is the probability of the segment $y_{j'+1:j}$ emitted by $x_t$ and $p(y_{j+1:j'} \mid x_{t+1})$ is similarly defined. For j=j', the notation $y_{j'+1:j}$ indicates an empty segment with previous output $y_{1:j}$. The segment probabilities are computed, in act 404, using forward propagation through the RNN that models them (e.g., RNN 300), optionally conditioned based on the hidden state of the RNN that models the connections between segments (e.g., RNN 310). The probability of the output sequence as expressed in terms of the forward and backward probabilities can then be efficiently computed, in act 406, using the above recursions for $\alpha_t(j)$ and $\beta_t(j)$ with initial conditions $\alpha_0(0)=\beta_{T'}(T)=1$ and $\alpha_0(j)=0$ for all $j \neq 0$ and $\beta_{T'}(j)=0$ for all $j \neq T$.

For non-sequence input, the probability of the output sequence can be analogously constructed from similarly defined forward and backward probabilities:

$$p(y_{1:T} \mid x) = \sum_{j=0}^{T} \alpha(j)\beta(j),$$

where $\alpha(j)=p(y_{1:j} \mid x)$ and $\beta(j)=p(y_{j+1:T} \mid x, y_{1:j})$ can be computed using the dynamic-programming recursions:

$$\alpha(j) = \sum_{j'=0}^{j-1} \alpha(j') p(y_{j'+1:i} \mid x)$$

-continued $$\beta(j) = \sum_{j'=j+1}^{T} \beta(j') p(y_{j+1:j'} \mid x),$$

with $\alpha(0)=\beta(T)=1$.

Following computation of the probability of the output sequence, the gradients of the logarithm of the probability with respect to the inputs to the RNN 300 for the segment probabilities (as discussed above with respect to FIGS. 3A and 3B)—that is, the gradients with respect to the input-sequence elements $x_t$ (which depend on network weights of a network used to encode the input sequence), the hidden states $h_k$ of the RNN 300 (which depend on network weights of the RNN 300), and the hidden states $\underline{h}_{j_{t-1}}$ of the RNN 310 (which depend on network weights of the RNN 310)—are computed (act 408). The network weights are then updated by following these gradients in a direction towards a maximum of the probability of the output sequence. With the above recursions for the forward and backward probabilities, the gradient of the logarithm of the probability with respect to the input element $x_t$, for instance, is:

$$\frac{\partial \log p(y_{1:T} \mid x_{1:T'})}{\partial x_t} = \sum_{j'=0}^{T} \sum_{j=0}^{j'} w_t(j, j') \frac{\partial \log p(y_{j+1:j'} \mid x_t)}{\partial x_t},$$

$$\text{where } w_t(j, j') \triangleq \alpha_{t-1}(j)\beta_t(j') \frac{p(y_{j+1,j'} \mid x_t)}{p(y_{1:T} \mid x_{1:T'})}.$$

Accordingly, the gradient with respect to $x_t$ is a weighted linear combination of contributions from related segments. (The formulas for non-sequence input can be obtained by dropping the subscripts t and t−1, and replacing $x_t$ and $x_{1:T'}$ with x.) Other gradients can be similarly derived. Based on the gradients, the network weights are updated, using back-propagation through the network (act 410) to maximize the probability of the output sequence given the input (averaged over all training examples). The result of the method 400 is a set of trained neural networks (412) with fixed and optimized network weights and parameters that can thereafter be used to compute an (unknown) output sequence for a given input.

The dynamic programming method 400 involves computing segment probabilities $p(y_{j+1:j'} \mid x_t)$ and associated gradients $$\frac{\partial \log p(y_{j+1:j'} \mid x_t)}{\partial x_t}$$

for $0 \leq j \leq j' \leq T$ and $0 \leq t \leq T'$, amounting to $\mathcal{O}(T'T^2)$ segments. Considering each recurrent step as a unit of computation, the overall complexity of computing the segment probabilities is $\mathcal{O}(T'T^3)$. Although the computation can be parallelized for different segments, training the network is still computationally expensive. In accordance with various embodiments, therefore, further strategies are employed to reduce the computational cost. One strategy is to limit the segment length to a maximum length L to reduce the computational complexity to $\mathcal{O}(T'T^2L)$; with a sufficiently high value of L, this limit will not be much of a limitation as a practical matter for many applications. For example, when segmenting text into phrases, or words into phonemes, a maximum length set to, for instance, L=10 will cover the vast majority, if not all, of meaningful phrases or word segmentations.

Another strategy for reducing the computational complexity of training the network is based on the observation that, due the structure of segments, computations performed for a longer segment can in part be reused to provide computational results for shorter segments contained within the longer segment. Considering forward propagation for fixed values of j and t, suppose, for example, that $p(y_{j+1:j'}|x_t)$ is to be computed for any j'=j, . . . , j+L, corresponding to L+1 segments with lengths ranging from 0 to L. The probability of the longest segment, $p(y_{j+1:j+L}|x_t)$ is determined as the product of the probabilities $p(y=y_{j+1}|x_t,h_0)$, $p(y=y_{j+2}|y_{j+1}, x_t, h_1)$, . . . , $p(y=y_{j+L}|y_{j+L-1}, x_t, h_{L-1})$, and $p(y=\$|y_{j+L}, x_t, h_L)$, where $h_l$, l=0, 1, . . . , L are the recurrent states (e.g., of RNN 300). Accordingly, computing the probability of the longest segment also provides the probabilities for the shorter segments, i.e., for j'=j, . . . , j+L−1.

For backward propagation, it can be observed that the contribution of each segment to the gradient of the output-sequence probability has its own respective weight, which is $w_t(j, j')$ for segment $y_{j+1:j'}$. Recognizing that the logarithm of the segment probability $p(y_{j+1:j+L}|x_t)$ can be determined as the sum of the logarithms of the individual probabilities $p(y=y_{j+1}|x_t, h_0)$, $p(y=y_{j+2}|y_{j+1}, x_t, h_1)$, . . . , $p(y=y_{j+L}|y_{j+L-1}, x_t, h_{L-1})$, and $p(y=\$|y_{j+L}, x_t, h_L)$, the gradient of the logarithm of the output-sequence probability can be determined by summing over the contributions of all output elements, each weighted by the sum of the weights of all segments in which that element occurs. Accordingly, the contributions of the elements within the longest segment are also used, with merely an adjusted weight, to account for the contributions of the shorter segments.

Figures 5A, 5B:
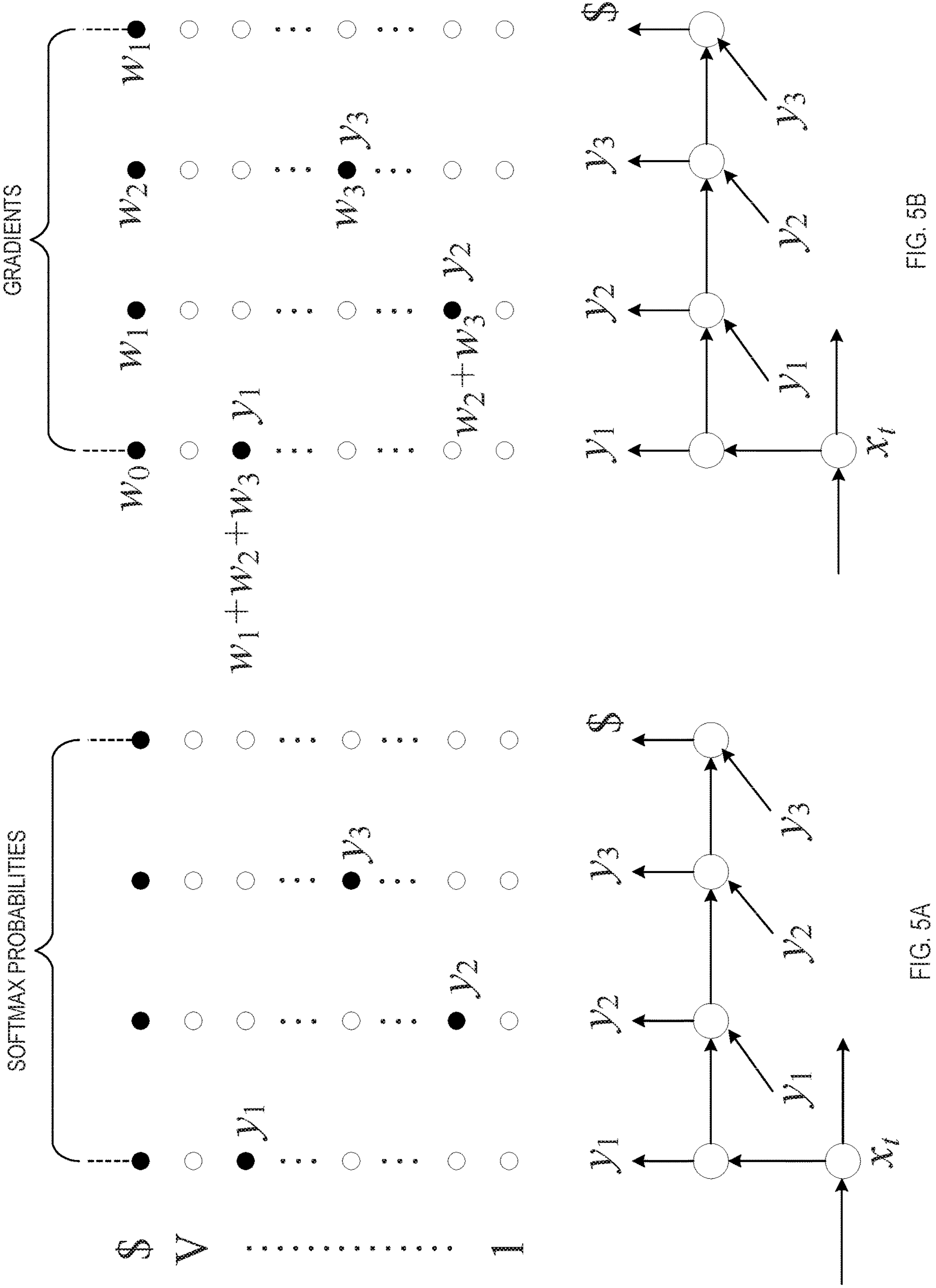
FIG. 5A is a conceptual diagram illustrating the efficient computation of example segment probabilities in accordance with various embodiments.
FIG. 5B is a conceptual diagram illustrating the efficient computation of example segment probability gradients in accordance with various embodiments.

FIGS. 5A and 5B are conceptual diagrams illustrating the efficient reuse of the segment contributions in the computation of the probability of the output sequence during forward propagation and of the gradient of its logarithm during backward propagation, respectively. In the depicted example, the probabilities and gradients for segments $y_{j+1:j'}$ (j'=0, . . . , L) are computed for j=0 and L=3, corresponding to a longest segment $\{y_1, y_2, y_3, \$\}$, and four shorter segments $\{y_1, y_2, \$\}$, $\{y_1, \$\}$, and $\{\$\}$. The possible values within the output vocabulary of size V are shown along the vertical axis. In FIG. 5A, filled circles indicate the softmax probabilities for computing the probabilities of all four segments. The softmax probabilities for $y_2$ and $y_1$ can be reused twice and once, respectively, reducing the overall computational cost. In FIG. 5B, filled circles indicate the gradient contributions of individual elements that flow into the computation of the gradients of all four segments. Each filled circle is annotated with the respective weight of the gradient contribution, $w_{j'} \triangleq w_t(0, j')$; open circles have zero gradients. For example, the gradient for element $y_1$ has a total weight $w_1+w_2+w_3$ since $y_1$ appears in three segments $\{y_1, y_2, y_3, \$^*\}$, $\{y_1, y_2, \$\}$, and $\{y_1, \$\}$.

Figure 6:
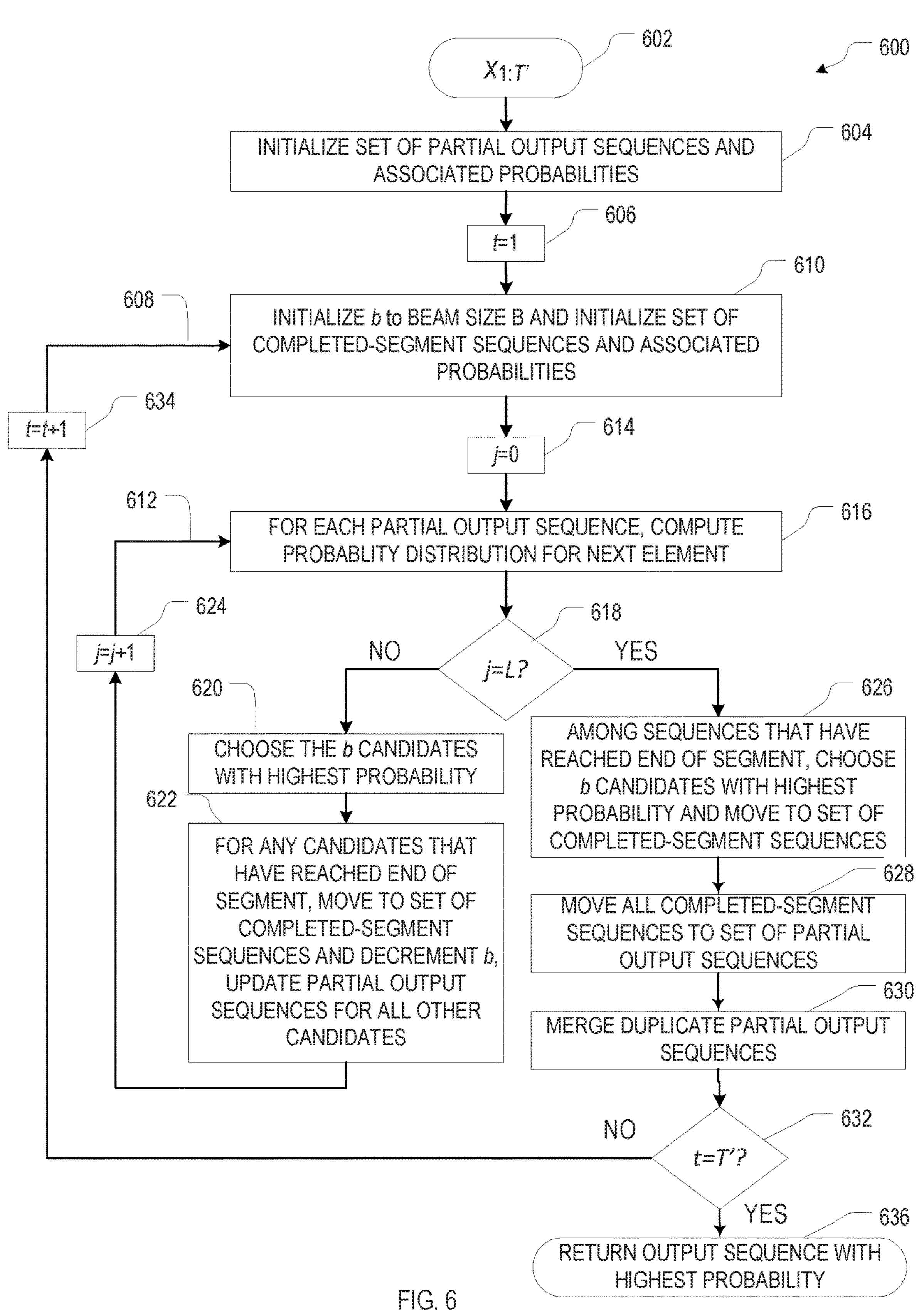
FIG. 6 is a flowchart illustrating a beam search algorithm for computing an output sequence from a given input using a trained set of artificial neural networks, in accordance with various embodiments.

FIG. 6 is a flowchart illustrating a beam search algorithm 600 for computing an output sequence from a given input, using a trained set of artificial neural networks (e.g., as resulting from the method 400 of FIG. 4), in accordance with various embodiments. The algorithm 600 takes a sequence $x_{1:T'}$ (602) as input, and iteratively expands a set of partial (candidate) output sequences, retaining only the B most probable candidates, where B is the beam width. After the set of partial output sequences $\mathcal{Y}$ and the set of associated probabilities $\mathcal{P}$ have been initialized, in act 604, to the null element (corresponding to a length-zero sequence that provides the starting point for extensions) and an associated probability of 1, left-to-right beam searches are performed for all input elements $x_t$, beginning with t=1 (initialized in act 606), to compute the respective output segments in a loop 608.

Each pass through the loop 608 begins, in act 610, with the initialization of a local beam size b to the global beam size B and empty sets $\mathcal{Y}_t$ and $\mathcal{P}_t$ for holding any partial output sequences that complete the current segment and the associated probabilities. The partial output sequences in $\mathcal{Y}$ that result from the computation for all previous segments (i.e., segments up to t−1, or, for the first loop at t=1, the null element) are then extended element by element in an inner loop 612 from j=0 (initialized in act 614) to j=L, where L is the maximum permissible segment length. In more detail, each pass through the inner loop 612 involves computing, for each partial output sequence $\mathscr{y} \in \mathcal{Y}$, the probability distribution for the next output element, $p(y_j|\mathscr{y}, x_t)$ (act 616). As long as j<L (as determined in decision act 618), the algorithm proceeds in act 620 with the selection, among all extended partial output sequences $\{\mathscr{y}, y_j\}$ with $\mathscr{y} \in \mathcal{Y}$ and $y_j \in \{1, \ldots, V, \$\}$ of b candidate sequences ("candidates") with the highest probability $\mathcal{P}(\mathscr{y})p(y_j|\mathscr{y}, x_t)$. For any such candidates that have reached the end of the segment, i.e., for which $y_j=\$$, the partial output sequence $\mathscr{y}$ is moved from $\mathcal{Y}$ to the set $\mathcal{Y}_t$ of completed-segment sequences, and b is decremented by 1 (in act 622). Further, the probability of the partial output sequence is assigned according to $\mathcal{P}_t(\mathscr{y}) \leftarrow \mathcal{P}(\mathscr{y})p(y_j|\mathscr{y}, x_t)$. For any candidates that have not yet reached the end of the segment, the partial output sequence is updated in accordance with the extension: $\mathscr{y} \leftarrow \{\mathscr{y}, y_j\}$ (also in act 622), and the probability of the partial output sequence is updated according to $\mathcal{P}(\mathscr{y}) \leftarrow \mathcal{P}(\mathscr{y})p(y_j|\mathscr{y}, x_t)$. The loop index j is then incremented to j+1 (act 624) for the next loop.

Once it is determined, in act 618, that j=L, the b most probable candidates among the extended partial output sequences that have reached the end of the segment (i.e., among $\{\mathscr{y}, \$\}$) are selected, the respective partial output sequences $\mathscr{y}$ (without the end-of-segment symbol) are moved to the set $\mathcal{Y}_t$ of completed-segment sequences, and their respective probabilities are updated according to $\mathcal{P}(\mathscr{y}) \leftarrow \mathcal{P}(\mathscr{y})p(y_j=\$|\mathscr{y}, x_t)$ (act 626). The set $\mathcal{Y}_t$ includes, at this stage, B partial output sequences each including segments 1 through t. In act 628, the partial output sequences in $\mathcal{Y}_t$ are moved (back) to the set $\mathcal{Y}$. It can happen, at this point, that $\mathcal{Y}$ contains duplicate partial output sequences $\mathscr{y}$ resulting from different segmentations. For example, a partial output sequence $\{y_1, y_2, y_3, y_4, y_5\}$ may result from the concatenation of first segment $\{y_1, y_2\}$ and second segment $\{y_3, y_4, y_5\}$, or from the concatenation of first segment $\{y_1, y_2, y_3\}$ and second segment $\{y_4, y_5\}$. Following the left-to-right beam search of each loop 608, any such identical partial output sequences obtained for multiple respective segmentations are merged, in act 630, by retaining only one instance thereof in the set $\mathcal{Y}$ and adding the respective probabilities up. Formally stated, for any pair $\mathscr{y}_i$, $\mathscr{y}_i \in \mathcal{Y}$ with $\mathscr{y}_i = \mathscr{y}_{i'}$ the probability is updated to $\mathcal{P}(\mathscr{y}_i) \leftarrow \mathcal{P}(\mathcal{Y}_i) + \mathcal{P}(\mathscr{y}_{1'})$, and $\mathscr{y}_{i'}$ is removed from $\mathcal{Y}$. As long as t<T' (as determined in decisional act 632), the index t is then incremented to t+1 (act 634), and the algorithm proceeds with the next segment. When the last segment, t=T', is reached, the algorithm returns the (now complete) output sequence $\mathscr{y} \in \mathcal{Y}$ with the highest associated probability as output 636.

In some application contexts, the output segments are independently modeled (i.e., the network used to model the output-segment probabilities is not conditioned on the concatenation of previous segments). In that case, output segments can be computed in parallel, reducing the time used to compute the output sequence.

The above-described approach to predicting output sequences modeled via segmentations (using, e.g., neural network configurations as illustrated in FIGS. 2A-3B and methods 400, 600 for training and decoding as shown in FIGS. 4 and 6) can be applied to various sequence modeling and sequence transduction tasks, both for sequence and non-sequence input. Example applications include, without limitation, automatic content-based text segmentation (where the input is not a sequence, and the output is a segmented text whose segments may be exchangeable), speech recognition, text-to-speech, DNA sequence segmentation, etc.

Figure 7:
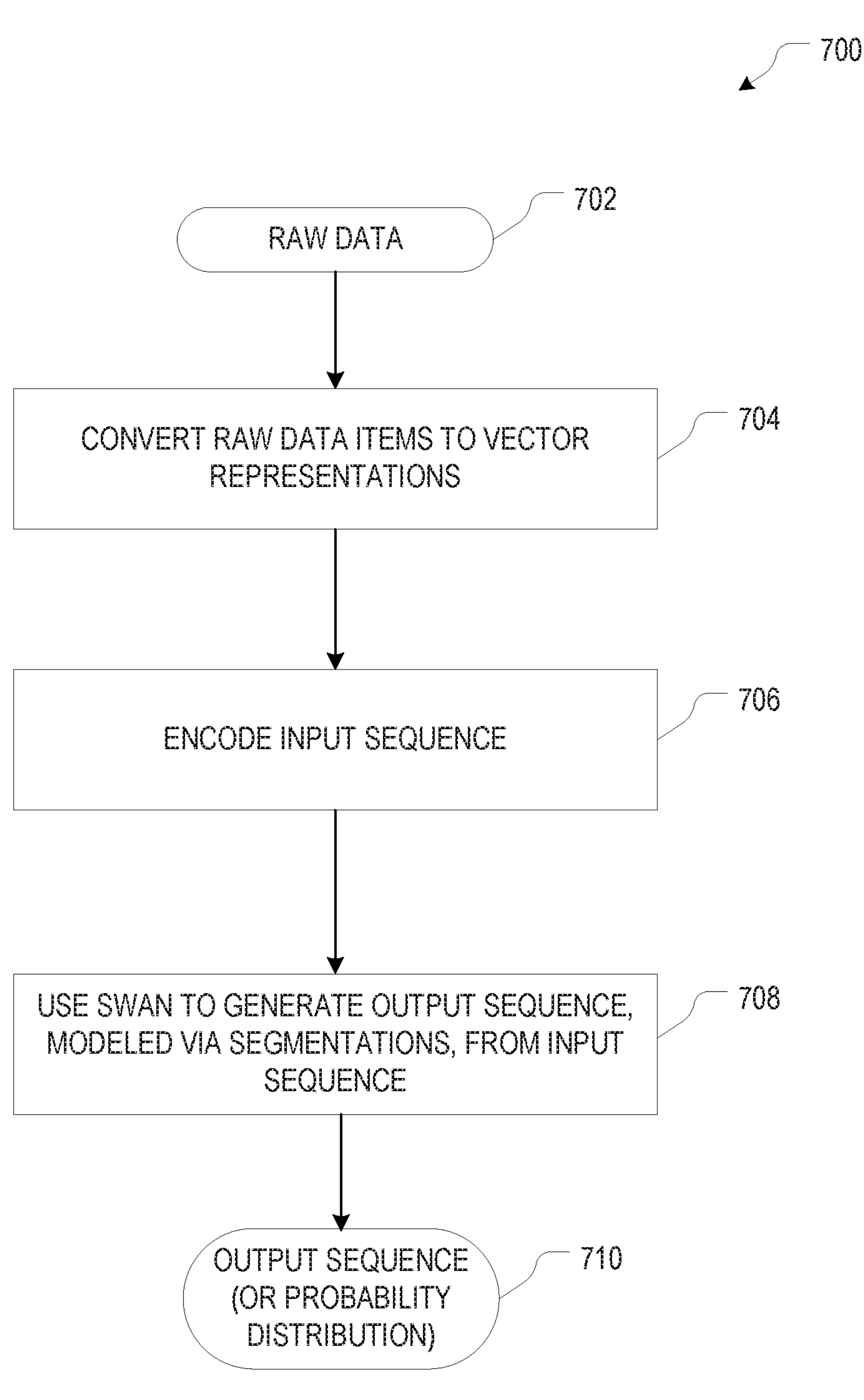
FIG. 7 is a flow chart of an example sequence-transduction method that incorporates sequence modeling via segmentations, in accordance with various embodiments.

FIG. 7 is a flow chart of an example sequence-transduction method 700, in accordance with various embodiments, that incorporates the above-described approach to sequence modeling. Input to the method 700 is raw data 702, which may be, for example, a text in a human language, or audio data representing human speech. The individual items of data 702 are converted, in a first act 704, into respective vector representations. For example, for text input, each word may be represented as a one-hot vector the size of the vocabulary that has a single component equal to 1 uniquely identifying the word, all other vector components being zero. As another example, for audio-data input, the data may be divided into a sequence of short time windows, and the vectors may represent spectral distributions of the audio data within these time windows, e.g., as computed using a filter bank. The sequence of vector representations of the individual data items may then be fed into a neural network for encoding as an input sequence $x_{1:T}$, in which element depends on its past and/or future context (act 706). From this input sequence $x_{1:T}$, or, alternatively, directly from the sequence of vector representations output by act 704, a SWAN as described above (and as depicted in FIG. 2B) generates an output sequence, or probability distribution of output sequences (710), modeling the output sequence via segmentations in accordance herewith (act 708). A unique output sequence may be determined from a probability distribution of sequences, e.g., by selecting the sequence with the highest probability.

In various embodiments, the SWAN approach is applied to the problem of machine translation, that is, the automatic translation of human-language input (usually text, although application to speech input is also conceivable) in a first language (e.g., English) into human language output in a second language (e.g., German). In human language, concrete meaning is often attached to phrases rather than individual words. For example, the statement "machine learning is a field of computer science" may be easier to comprehend if represented as "[machine learning] [is] [a field of] [computer science]," where square brackets enclose meaningful segments or phrases (herein used synonymously in the context of machine translation), which have their own meanings and are often reusable in other contexts. Since SWAN models output sequences via phrases, they have the potential to improve the accuracy of machine translation. As an approach to neural phrase-based machine translation, it can capture benefits from both traditional phrase-based statistical machine translation (such as the ability to explicitly model phrases) and conventional attention-based neural machine translation (which often provide better performance).

Figure 8:
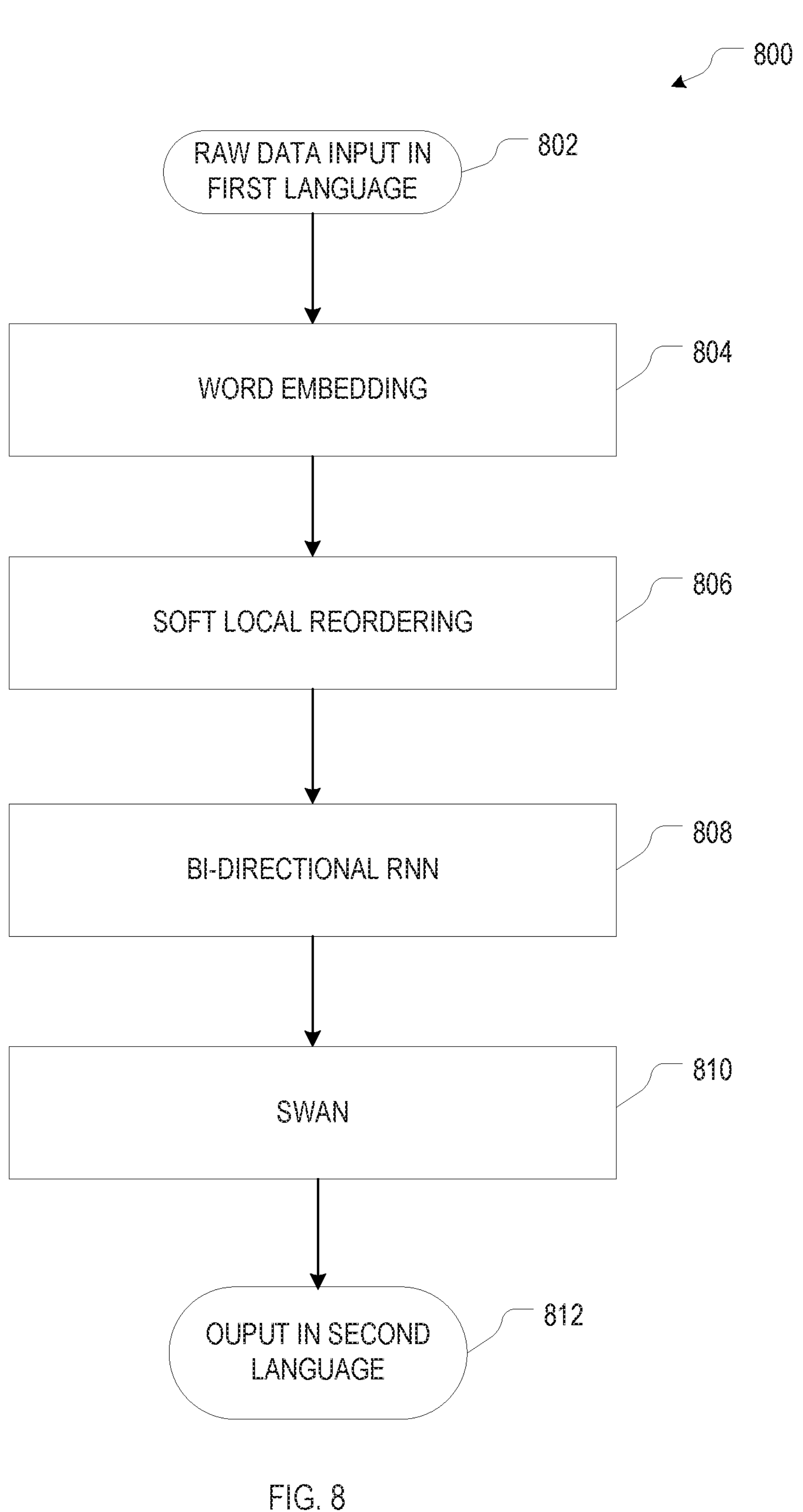
FIG. 8 is a flowchart illustrating an example neural-network architecture for phrase-based machine translation, in accordance with various embodiments.

As described above, SWAN allows for output sequences that are shorter or longer than the input sequence (or equal in length), but assumes monotonic alignment between input and output. In the context of translation, this assumption does not hold for many pairs of source and target languages. To mitigate this problem, the method 700 is modified, in accordance with various embodiments, by introducing a local reordering step in the workflow. FIG. 8 illustrates, in the form of a flowchart, an example layered neural-network architecture 800 for phrase-based machine translation in accordance with various embodiments, which traces the steps of method 700 but for the addition of the reordering layer. The neural network architecture 800 operates on human-language input 802 in a first language (constituting the source language), such as a text document. This raw input is converted into vector representations in a word-embedding layer 804. Word embedding maps the words from the vocabulary of the first language to vectors of real numbers (and thus from a space with one dimension per word to a continuous vector space with generally much lower dimension), and can be accomplished with a neural network, or, alternatively, with any of a number of other language-modeling and feature-learning techniques known in the field of natural language processing (e.g., dimensionality reduction on the word co-occurrence matrix, or using probabilistic models, etc.).

Following word embedding, the "embedded representation" passes through a (soft) local reordering layer 806, explained in more detail below. The reordered representation is fed as input to a bi-directional RNN layer 808 to generate the encoded input sequence $x_{1:T}$, that flows into the SWAN layer 810. In the bi-directional RNN layer 808, the input sequence is processed from left to right as well as from right to left to predict each element of the input sequence based on past and future context. Possible alternatives to a bi-directional RNN for input-sequence encoding include, for example, convolutional neural networks (CNNs), LSTM networks, bidirectional LSTM networks, GRU networks, and transformer networks. The SWAN layer 810 may include, e.g., the RNNs 300, 310 described in FIGS. 3A and 3B. Output of the SWAN layer is an output sequence (or probability distribution over output sequences) that can be straightforwardly mapped onto human-language output 812 in a second language (constituting the target language). For example, the elements of the output sequence may be vectors that serve directly as identifiers of words (e.g., one-hot vectors whose components correspond to the words in the vocabulary), or vectors that identify sub-units of words (such as characters or n-grams) that can be merged into words. The network layers 804, 806, 808, 810 of the neural network architecture 800, which may be thought of as a first set of neural networks (corresponding to layer 810) for modeling an output sequence via segmentations in accordance herewith and a second set of neural networks (corresponding to layers 804, 806, 808) for generating the input sequence to layer 810 from a human-language input sequence, may be trained end-to-end based on training data that includes pairs of input and output sequences in the source and target languages, respectively. The training may involve backpropagation of errors as described above with respect to the SWAN layer 810, extended to the other layers within the larger network.

Figure 9:
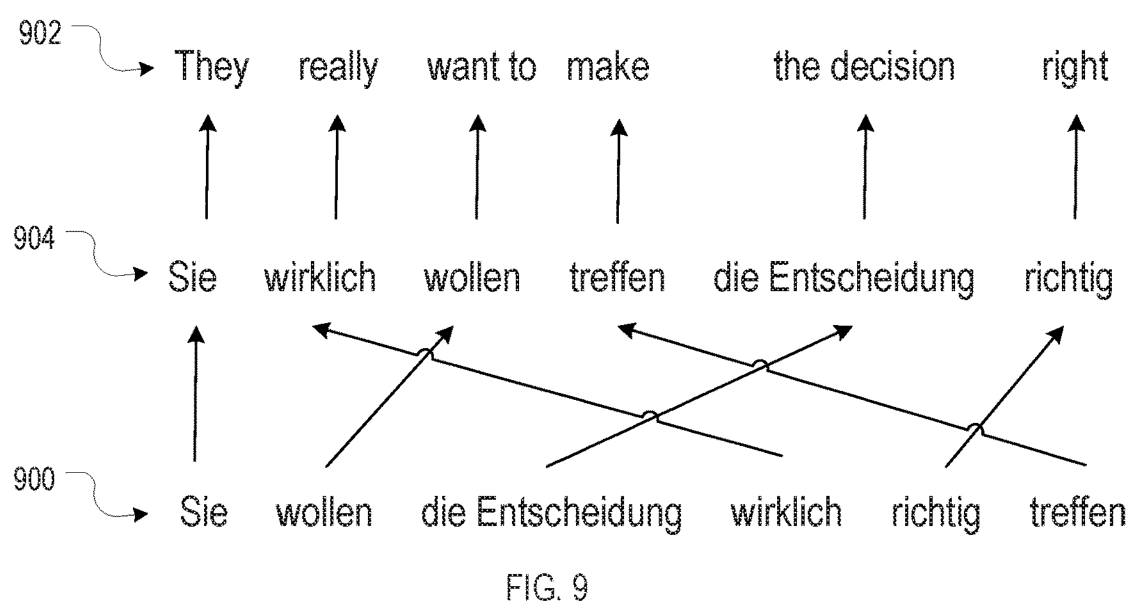
FIG. 9 is a text example illustrating local reordering in accordance with various embodiments.

FIG. 9 is a text example illustrating soft reordering in accordance with various embodiments. Here, in the course of translating the German sentence "Sie wollen die Entscheidung wirklich richtig treffen" (900) to the English sentence "You really want to make the decision right" (902), the word order of the German sentence is modified to result in a reordered sequence (904) that is monotonically aligned with the English output.

To formally describe the operation of the local reordering layer 806, let $e_{1:T}$, denote the sequence of vector representations resulting from word embedding that constitute the input to the reordering layer 806, and let $f_{1:T}$, denote the sequence of output vectors of the reordering layer 806. The reordering is "local" in that the position of each input vector et within the input sequence can change only within a fixed input window of size 2$t$+1. With these notations, in some embodiments, the output of the reordering layer 806 is computed from the input according to:

$$f_t = \tanh\left(\sum_{i=0}^{2\tau} \sigma\left(w_i^T [e_{t-\tau}; \ldots ; e_t; \ldots; e_{t+\tau}]\right) e_{t-\tau+i}\right),$$

where σ(•) is the sigmoid function (implementing a gate function for the reordering layer), $[e_{t-\tau}; \ldots ; e_t; \ldots ; e_{t+\tau}]$ is the concatenation of the input vectors within the input window, and $$w_i^T$$

are vectors (each having a dimensionality of 2τ+1 times the dimensionality of the individual input vectors) that constitute parameters for the gate function at respective positions i of the input window. The sigmoid function applied to the scalar product of the parameter $$w_i^T$$

and $[e_{t-\tau}; \ldots ; e_t; \ldots ; e_{t+\tau}]$ determines how much information from element of $e_{t-\tau+i}$ of the input window is accepted through the "gate" σ. The gate may take any value between zero and one; the reordering layer is, in that sense "soft." The final output $f_t$ is a weighted linear combination of the input vectors $e_{t-\tau}, \ldots, e_t, \ldots, e_{t+\tau}$ in the window, followed by a non-linear transformation by the tanh(•) function (applied separately to each vector element of the combination of input vectors $e_{t-\tau}, \ldots, e_t, \ldots, e_{t+\tau}$).

Figure 10A:
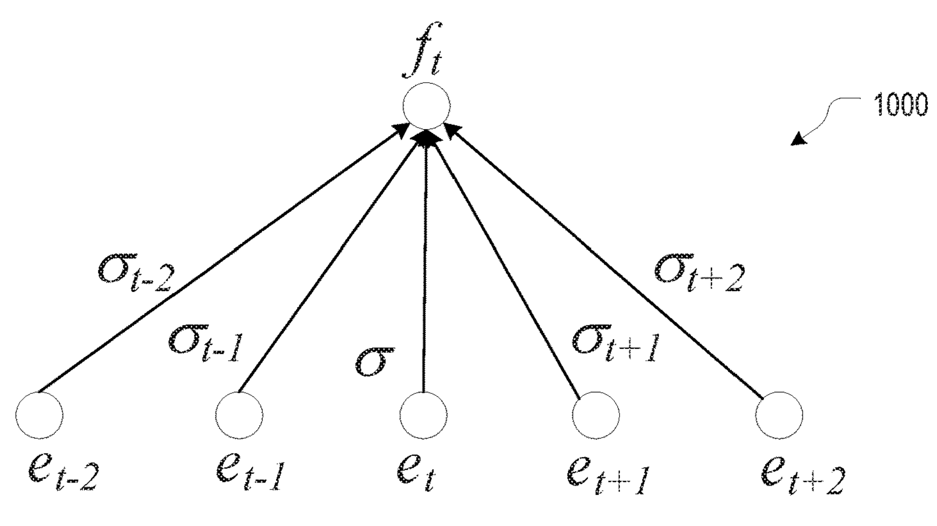
FIG. 10A is a conceptual network diagram illustrating an example local reordering layer in accordance with various embodiments.
Figure 10B:
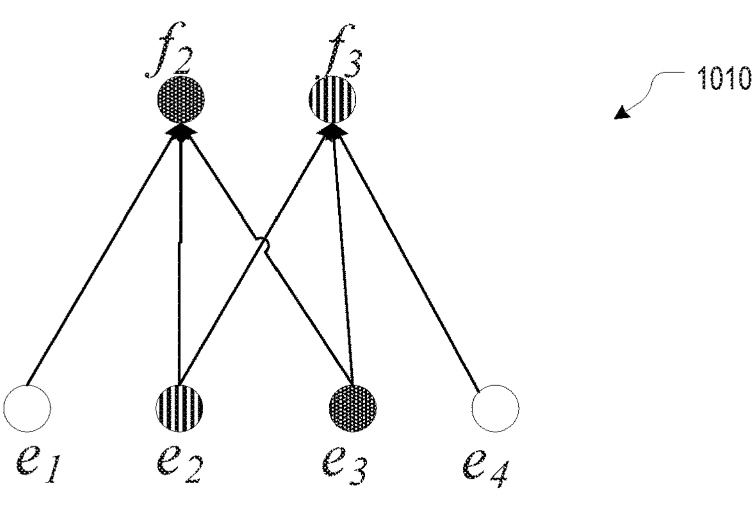
FIG. 10B is a conceptual network diagram illustrating an example result of local reordering in accordance with various embodiments.

FIG. 10A is a conceptual network diagram 1000 illustrating an example local reordering layer with a window size of 5 (τ=2). Here, $\sigma_{t-2+i} \triangleq$ $$\sigma\left(w_i^T [e_{t-2}; e_{t-1}; e_t; e_{t+1}; e_{t+2}]\right),$$

i=0, . . . , 4 are the gates for input vectors $e_{t-2+i}$, respectively. Note that the gate for each individual input vector is decided based on information from all input vectors within the window. As a further illustration, FIG. 10B is a conceptual network diagram 1010 showing how local reordering works. In the depicted example, two adjacent windows of length three, corresponding to input vector sequences $\{e_1, e_2, e_3\}$ and $\{e_2, e_3, e_4\}$, respectively, are processed to determine two respective outputs $f_2$ and $f_3$. If $e_3$ gets the largest weight (and is thereby picked) in the first window and $e_2$ gets the largest weight (and is thereby picked) in the second window, $e_2$ and $e_3$ are effectively reordered.

FIG. 11 is an example grid of gate values, further illustrating the behavior of the reordering layer in accordance with various embodiments. In this example, the English source sentence "can you translate it?" is translated to "können man es übersetzen?," where the mapping between words is: "can→können," "you→man," "translate→übersetzen," "it→es," and "?→?" This mapping implies a reordering from "translate it" to "es übersetzen." In the depicted grid of gate values, each row represents a window of size seven (corresponding to τ=3) that is centered at a word of the source sentence. The values in the grid represent the gate values $$\sigma\left(w_i^T [e_{t-\tau}; \ldots; e_t; \ldots ; e_{t+\tau}]\right)$$

for the words within each window, which are to be multiplied with the embedded vectors $e_{t-\tau+i}$ to determine their respective contributions to the vector $f_t$ output by the reordering layer; gate values above a threshold corresponding to selection of the respective input vectors are shaded. Along the vertical axis, the words or phrases emitted by the SWAN layer for the corresponding positions t are shown. As can be seen, the gates mostly focus on the central word, reflected in monotonic alignment between input and output for the first two words of the sentence. Interestingly, for the window centered at the third word, "translate," the model outputs "$" (corresponding to an empty segment). Then, the model outputs "es" when the model encounters "it." Finally, in the last window (shown in the top row), the model not only has a large gate value for the center input "?," but it also has a relatively large gate value for the word "translate," and outputs, as a result, the translation "übersetzen?" This illustrates the reordering effect achieved using the gating mechanism of the reordering layer.

Beneficially, the neural phrase-based machine translation approach described above, which uses SWAN in conjunction with a local reordering layer, does not use an attention-based decoder with predefined phrases (as commonly used with conventional neural machine translation), but automatically discovers the phrase structures of the target language based on training data. Further, it can decode in linear time, and may outperform conventional machine translation approaches. The reordering layer of the present approach differs from attention mechanisms in multiple ways: it does not rely on a hidden representation to use as a query when decoding a word; the weights $$w_i^T$$

for the input vectors $e_{t-\tau+i}$ of the layer are not normalized to a sum equal to one, which provides reordering capability that can potentially turn off everything (i.e., allow for all weights to be set to zero); the gate value at any position is determined by all input vectors within the window; and the layer performs locally similar to a convolutional layer and the positional information is encoded by a different parameter $$w_i^T$$

for each relative position i in the window. Further, since the reordering of elements is local, i.e., confined to a specified input window, the described neural machine-translation approach is amenable, in various embodiments (not employing a bidirectional RNN in layer 808), to incremental output of the translation into the target language as the sequence in the source language comes in.

Although the local reordering layer 808 has been described in the context of a neural network architecture that employs SWAN, the scope of potential applications extends beyond use with SWAN. For instance, local reordering as described herein can also be used to produce input for a CTC layer, RNN layer, CNN layer, or other neural network layer for predicting an output sequence from an input sequence (and substituting for SWAN in the network architecture 800). Furthermore, the disclosed machine-translation approach with local reordering is not limited to a translation from one language to another in the strictest sense, but can also be employed in other sequence-input to sequence-output transduction tasks, including, for example, conversational response modeling, grammar correction, summarization, and the like.

Figure 12:
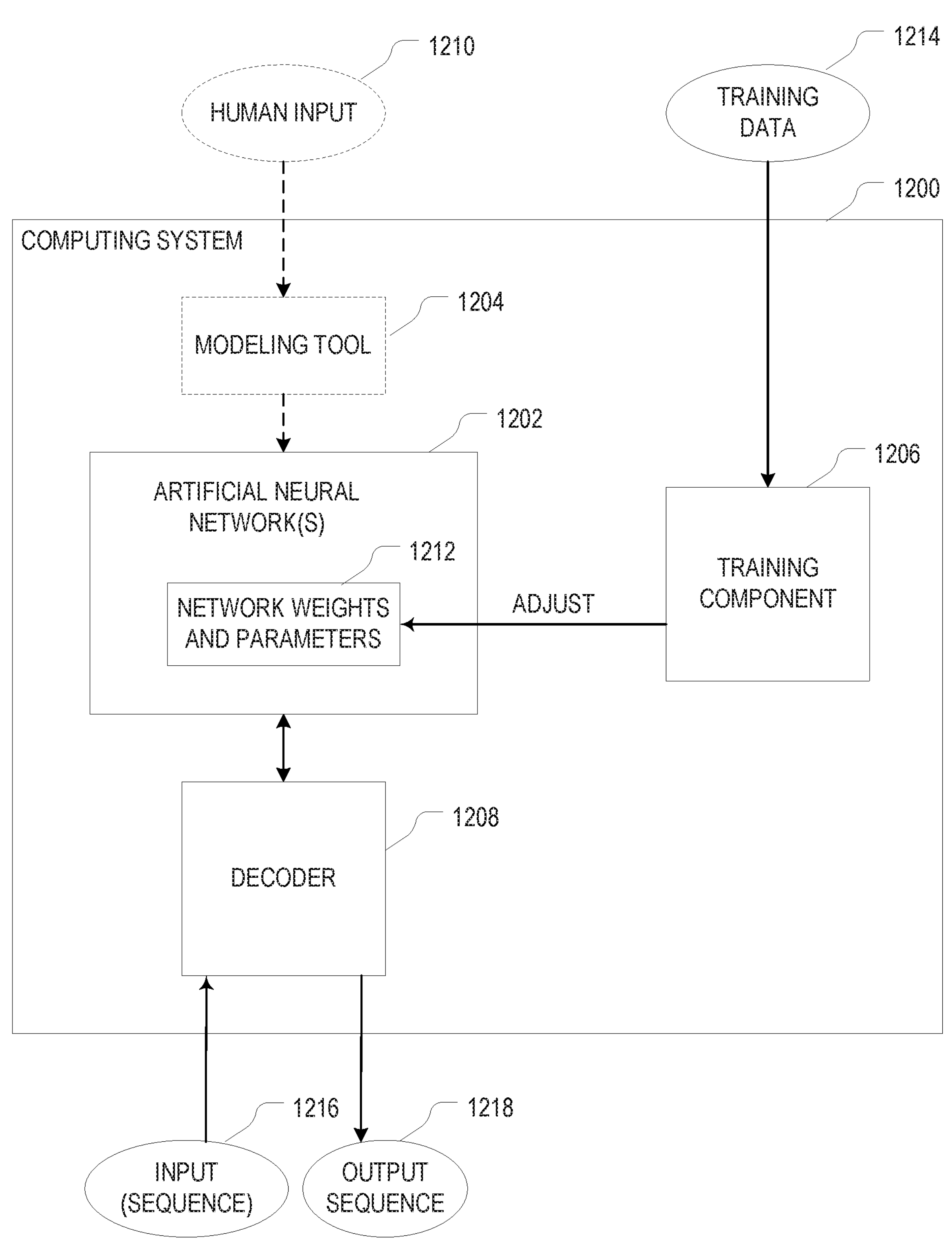
FIG. 12 is a block diagram illustrating an example system to implement neural networks for modeling sequences via segmentations, in accordance with various embodiment.

FIG. 12 illustrates an example computing system 1200 for implementing the methods 100, 400, 600, 700, 800 for training artificial neural networks as described herein and using them to predict output sequences. The computing system may generally include any suitable combination of hardware and software, for instance, in accordance with some embodiments, one or more (e.g., general-purpose) computers (e.g., as illustrated in more detail in FIG. 13) that collectively include one or more hardware processors for executing software instructions and one or more machine-readable media storing the instructions as well as the data on which they operate (such as, e.g., the input and output sequences, the weights and parameters of the neural networks, and results of partial computations for reuse). The overall functionality of the computing system 1200 may be organized into multiple software tools, components, or modules. For example, as depicted, the computing system 1200 may include, in addition to the artificial neural network(s) 1202 themselves, a modeling tool 1204, a training component 1206, and a decoder 1208. Each of these components 1202, 1204, 1206, 1208 may be implemented in software, that is, with program code and associated data structures.

The modeling tool 1204 may provide a user interface that allows a human model developer to provide input 1210 to define the structure of the neural network(s) 1202, e.g., by specifying—graphically or otherwise—the number and types of network layers, the dimensionality of the associated inputs and outputs, the types of network units used within the layers, the activation functions associated with the network nodes or units, the connections between layers, and so on. Based on this input 1210, the modeling tool 1204 may build program code and associated data structures implementing the neural network(s) 1202, e.g., using code and data-structure templates. Alternatively, the program code and data structures of the neural network(s) 1202 may be provided directly to the computing system 1200 (e.g., as one or more files downloaded to the computing system 1200). The neural network(s) may include the RNNs 300, 310 used to model a segmented output sequence for sequence or non-sequence input, as well as, depending on the particular application, additional network layers to generate the input to the RNNs 300, 310, e.g., the word-embedding, local-reordering, and sequence-encoding layers 804, 806, 808 of the neural network architecture 800 for machine-translation applications.

The neural network(s) as originally defined generally include a number of network weights or other parameters 1212 that are to be optimized through training. The training component 1206 adjusts these network parameters 1212 based on training data 1214 provided as input to the computing system 1200. The training data includes pairs of an input (which may or may not be a sequence) and an output sequence whose format depends on the overall architecture of the neural network(s) to be trained. For example, to train the neural network architecture 800 for machine translation end-to-end, the input and output sequences may be strings reflecting texts in the source and target languages, respectively. On the other hand, if, for instance, a SWAN layer is trained separately, at least the input is provided in the form of real-valued vectors. The training component 1206 may include algorithms implementing, e.g., the forward and backward propagations through the network that are described above with respect to FIGS. 4-5B.

The decoder 1208 may use the neural network(s), once trained, to generate, from an input (sequence) 1216, a corresponding output sequence 1218: the format of these sequences generally conforms to that of the (application-dependent) format of the training data. The input (sequence 1216) may be provided to the computing system 1200 via a user interface, such as, e.g., an interface that allows the user to type in text, or record speech, to be translated. Alternatively, the input may be provided in the form of a file uploaded to the computing system 1202, or be fed into the decoder directly from another computational component (within or outside the computing system 1200) that produces it as output. Similarly, the output sequence 1218 may be output via a user interface, e.g., in a machine-translation application, in the form of a translated text or audio output; saved to a file; or sent to a downstream computational component for further processing. Other modes of input and/or output may occur to those of ordinary skill in the art. The decoder 1208 may implement algorithms for feeding the input 1216 to the neural network(s) 1202 for generating the output sequence 1218 or elements thereof. For example, a decoder for SWAN may include program code implementing the beam search algorithm described with reference to FIG. 6.

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 13:
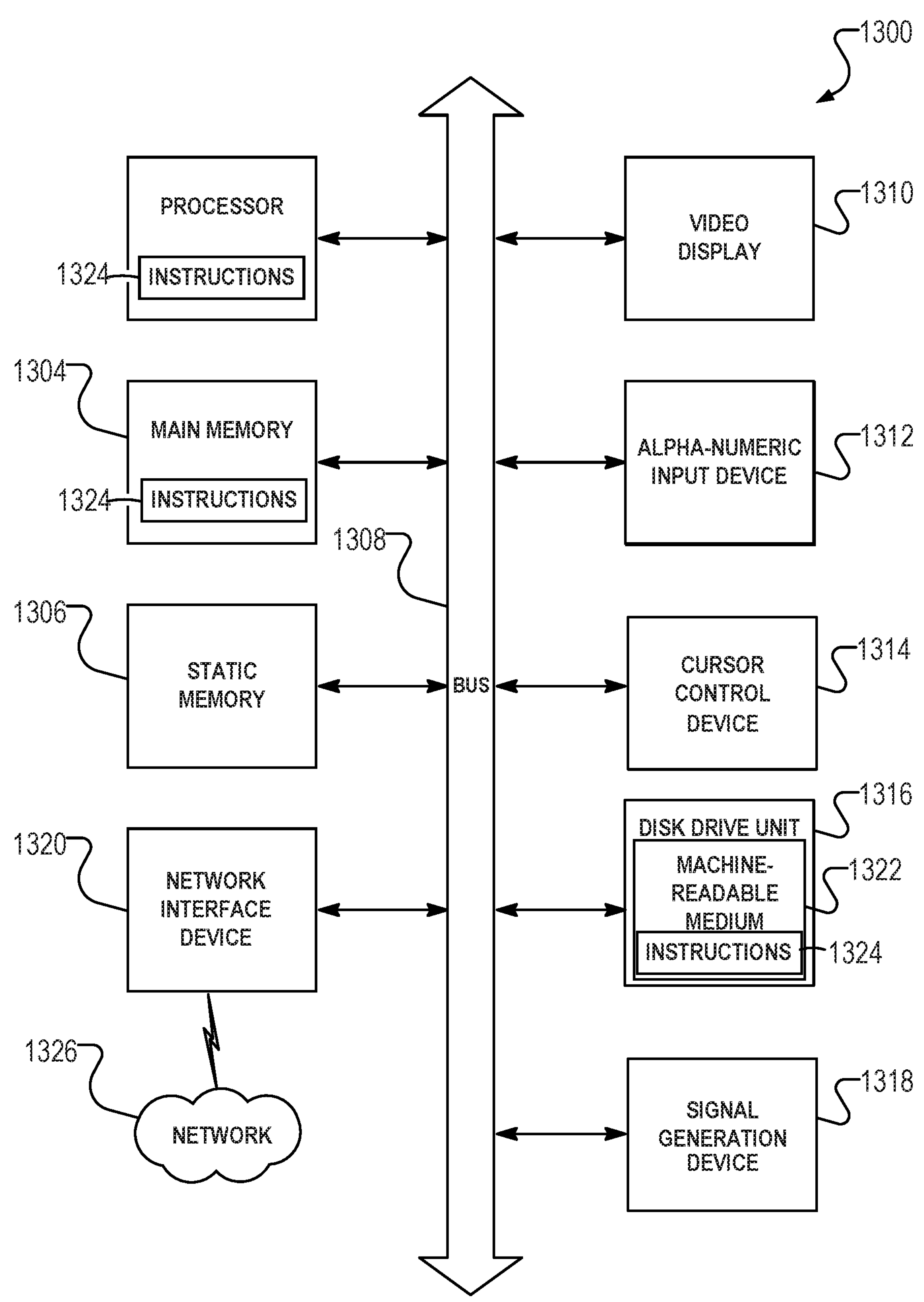
FIG. 13 is a block diagram illustrating an example computational system accordance with various embodiments.

FIG. 13 is a block diagram of a machine in the example form of a computer system 1300 within which instructions 1324 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 can further include a video display 1310 (e.g., a liquid crystal display (LCD) or a cathode ray tube (CRT)). The computer system 1300 also includes an alpha-numeric input device 1312 (e.g., a keyboard or a touch-sensitive display screen), a user interface (UI) navigation (or cursor control) device 1314 (e.g., a mouse), a disk drive unit 1316, a signal generation device 1318 (e.g., a speaker), and a network interface device 1320.

The disk drive unit 1316 includes a machine-readable medium 1322 on which are stored one or more sets of data structures and instructions 1324 (e.g., software) embodying or utilized by any one or more of the methodologies or functions described herein. The instructions 1324 can also reside, completely or at least partially, within the main memory 1304 and/or within the processor 1302 during execution thereof by the computer system 1300, with the main memory 1304 and the processor 1302 also constituting machine-readable media.

While the machine-readable medium 1322 is shown in an example embodiment to be a single medium, the term "machine-readable medium" can include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding, or carrying instructions 1324 for execution by the machine and that cause the machine to perform any one or more of the methodologies of the present disclosure, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1324 can be transmitted or received over a communication network 1326 using a transmission medium. The instructions 1324 can be transmitted using the network interface device 1320 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 1324 for execution by the machine, and includes digital or analog communications signals or other intangible media to facilitate communication of such software.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method of translating an input sequence representing a human-language sequence in a first language into an output sequence representing a human-language sequence in a second language, the method comprising performing, by one or more hardware processors, operations comprising:

training a first set of artificial neural networks, on training examples each comprising a training input sequence and an associated training output sequence;

using a trained second set of artificial neural networks to generate the input sequence from the human-language sequence in the first language, the second set of neural networks comprising a local reordering layer for locally reordering an embedded representation of the human-language sequence in the first language;

using a beam search algorithm to determine the output sequence from the input sequence based on the trained first set of artificial neural networks, wherein the output sequence comprises vectors identifying words or subunits of words in the second language;

mapping the output sequence onto human-language output in the second language; and providing the human-language output, wherein the training comprises:

for each training example, computing a probability of the associated training output sequence by performing operations including:

operating, for valid segmentations of the training output sequence into segments, instances of a first recurrent neural network of the first set of artificial neural networks on the training input sequence to compute output-segment probabilities for the segments; and using dynamic programming recursions, computing the probability of the training output sequence as a sum of probabilities of the valid segmentations of the training output sequence into segments, wherein the probability of each valid segmentation is a product of the output-segment probabilities computed for the segments of the training output sequence for the respective segmentation; and using backpropagation to update network weights of the first set of artificial neural networks based on gradients of the probabilities of the training output sequences of the training examples.

2. The method of claim 1, wherein the output-segment probabilities depend on respective concatenations of preceding output segments, and wherein the operations for computing the probability of the training output sequence further include using a second recurrent neural network of the first set of artificial neural networks to compute encodings of the respective concatenations of preceding output segments.

3. The method of claim 1, wherein computing the probability of the training output sequence comprises recursively computing forward and backward probabilities for two-way output-sequence partitioning.

4. The method of claim 1, wherein, in computing the output-segment probabilities, an output-segment length is limited to a specified maximum value.

5. The method of claim 1, wherein, in computing the output-segment probabilities and in computing gradients of the output-segment probabilities during the backpropagation, contributions computed for longer output segments are reused during computations for shorter output segments contained in the respective longer output segments.

6. The method of claim 1, wherein the beam search algorithm comprises, for each element of the input sequence, performing a left-to-right beam search and thereafter merging any identical partial candidate output sequences obtained for multiple respective segmentations of the output sequence.

7. The method of claim 1, wherein the output sequence is modeled as monotonically aligned with the input sequence and as having a number of segments equal to a number of elements in the input sequence, empty segments being permitted.

8. The method of claim 1, wherein an output element of the local reordering layer is computed as a non-linear transformation of a weighted linear combination of elements of the embedded representations within an input window, each element being weighted in the weighted linear combination by gate values that depend on all elements within the input window.

9. The method of claim 1, wherein the second set of neural networks further comprises a word-embedding layer that generates the embedded representation of the human-language sequence in the first language by word embedding.

10. The method of claim 1, wherein the second set of neural networks further comprises a bidirectional recurrent neural network that generates the input sequence from the reordered embedded representation.

11. One or more non-transitory machine-readable media storing:

data defining a trained first set of artificial neural networks, the first set of artificial neural networks modeling, for an output sequence admitting of segmental structure, a distribution of a probability of the output sequence over possible output sequences, wherein:

the probability of the output sequence is a sum of probabilities of all valid segmentations of the output sequence into segments, the probability of each valid segmentation is a product of output-segment probabilities of the individual segments of the output sequence for the respective segmentation, and the first set of artificial neural networks models distributions of the output-segment probabilities with respective instances of a recurrent neural network having an associated softmax layer;

data defining a trained second set of artificial neural networks modeling generation of encoded input sequences from human-language sequences in the first language, the second set of neural networks comprising a local reordering layer for locally reordering embedded representations of the human-language sequences in the first language; and instructions for execution by one or more hardware processors, the instructions, when executed by the one or more hardware processors, causing the one or more hardware processors to perform operations for translating human-language input from a first language to a second language, the operations comprising:

encoding, with the trained second set of artificial neural networks, the human-language input into an encoded input sequence;

using a beam search algorithm to determine the output sequence from the encoded input sequence based on the trained first set of artificial neural networks, wherein the output sequence comprises vectors identifying words or sub-units of words in the second language;

mapping the output sequence onto human-language output in the second language; and providing the human-language output.

12. The one or more machine-readable media of claim 11, wherein the beam search algorithm comprises, for each element of the encoded input sequence, performing a left-to-right beam search and thereafter merging any identical partial candidate output sequences obtained for multiple respective segmentations of the output sequence.

13. A system comprising:

one or more hardware processors; and one or more machine-readable media storing instructions for execution by the one or more hardware processors, the instructions, when executed by the one or more hardware processors, causing the one or more hardware processors to perform operations for translating an input sequence representing a human-language sequence in a first language into an output sequence representing a human-language sequence in a second language, the operations comprising:

training a first set of artificial neural networks on training examples each comprising a training input sequence and an associated training output sequence;

using a trained second set of artificial neural networks to generate the input sequence from the human-language sequence in the first language, the second set of neural networks comprising a local reordering layer for locally reordering an embedded representation of the human-language sequence in the first language;

using a beam search algorithm to determine the output sequence from the input sequence based on the trained first set of artificial neural networks, wherein the output sequence comprises vectors identifying words or sub-units of words in the second language;

mapping the output sequence onto human-language output in the second language; and providing the human-language output, wherein training the first set of artificial neural networks comprises:

for each training example, computing a probability of the associated training output sequence by performing operations including:

operating, for valid segmentations of the training output sequence into segments, instances of a first recurrent neural network of the first set of artificial neural networks on the training input sequence to compute output-segment probabilities for the segments; and using dynamic programming recursions, computing the probability of the training output sequence as a sum of probabilities of the valid segmentations of the training output sequence into segments, wherein the probability of each valid segmentation is a product of the output-segment probabilities computed for the segments of the output sequence for the respective segmentation; and using backpropagation to update network weights of the first set of artificial neural networks based on gradients of the probabilities of the training output sequence of the training examples.

* * * * *